United States Patent
Kimura

(10) Patent No.: US 9,930,319 B2
(45) Date of Patent: Mar. 27, 2018

(54) IMAGE PROCESSING APPARATUS, IMAGE CAPTURING APPARATUS, CONTROL METHOD, AND RECORDING MEDIUM

(71) Applicant: CANON KABUSHIKI KAISHA, Tokyo (JP)

(72) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 14/163,305

(22) Filed: Jan. 24, 2014

(65) Prior Publication Data

US 2014/0226038 A1 Aug. 14, 2014

(30) Foreign Application Priority Data

Feb. 12, 2013 (JP) .................................. 2013-024915

(51) Int. Cl.
*H04N 13/02* (2006.01)
*H04N 5/235* (2006.01)
*H04N 5/232* (2006.01)

(52) U.S. Cl.
CPC ....... *H04N 13/0282* (2013.01); *H04N 5/2356* (2013.01); *H04N 5/23212* (2013.01); *H04N 5/23254* (2013.01); *H04N 5/23277* (2013.01); *G06T 2200/21* (2013.01); *G06T 2207/10052* (2013.01)

(58) Field of Classification Search
CPC .......... H04N 13/0282; H04N 5/23212; H04N 5/2356; H04N 5/3696; G06T 2200/21; G06T 2207/10052

USPC ......... 348/218.1, 222.1, 239, 335, 340, 345; 250/208.1

See application file for complete search history.

(56) References Cited

U.S. PATENT DOCUMENTS 7,496,287 B2 * 2/2009 Sasaki ................... G06T 7/2033
348/208.1
8,018,999 B2 * 9/2011 Yao ........................... G06T 5/50
348/208.13

(Continued)

FOREIGN PATENT DOCUMENTS

JP 59034772 A 2/1984

OTHER PUBLICATIONS

Ren Ng, et al. Light Field Photography with a Hand-held Plenoptic Camera, Stanford University Computer Science Tech Report CTSR Feb. 2005.

(Continued)

*Primary Examiner* — Lin Ye
*Assistant Examiner* — Chriss Yoder, III
(74) *Attorney, Agent, or Firm* — Cowan, Liebowitz & Latman, P.C.

(57) ABSTRACT

An image processing apparatus obtains a plurality of images obtained by shooting the same subject at different positions, at each of a plurality of timings. Then, a first phase difference between images obtained at the same time, and a second phase difference between images obtained by shooting at the same position but at different timings, are detected. The image processing apparatus then selects at least some of the obtained images as images to be used in synthesis in accordance with a set generation condition, synthesizes the images so as to eliminate at least one of the first and second phase differences, and outputs the resulting image.

10 Claims, 14 Drawing Sheets

(56) References Cited

U.S. PATENT DOCUMENTS

| | | | |
|---|---|---|---|
| 2005/0018927 A1* | 1/2005 | Manabe | H04N 5/23248 382/294 |
| 2009/0060281 A1* | 3/2009 | Tanida | G06T 3/00 382/106 |
| 2010/0283863 A1* | 11/2010 | Yamamoto | G02B 27/0075 348/222.1 |
| 2011/0175993 A1* | 7/2011 | Uemori | H04N 5/23212 348/79 |
| 2011/0199458 A1* | 8/2011 | Hayasaka | G06T 7/0075 348/43 |
| 2012/0019678 A1* | 1/2012 | Fujita | H04N 5/23245 348/208.4 |
| 2012/0069235 A1* | 3/2012 | Imai | H04N 5/23212 348/333.11 |

OTHER PUBLICATIONS

Todor Georgiev and Andrew Lumsdaine, Superresolution with Plenoptic 2.0 Cameras, Signal Recovery and Synthesis, Optical Society of America, 2009.

* cited by examiner

IMAGE PROCESSING APPARATUS, IMAGE CAPTURING APPARATUS, CONTROL METHOD, AND RECORDING MEDIUM

BACKGROUND OF THE INVENTION

1. Field of the Invention

The present invention relates to an image processing apparatus, an image capturing apparatus, a control method, and a recording medium, and particularly relates to techniques for generating images that are focused at a desired depth based on output data obtained through shooting.

2. Description of the Related Art

In recent years, image capturing apparatuses such as digital cameras that, when capturing an image, record information indicating a two-dimensional intensity distribution of light and an angle of incidence of light rays in a subject space (that is, light field information) as data (light field data, or "LF data") have appeared. By performing predetermined processing on the LF data obtained in this manner, an image that is focused at a desired depth (a "reconstructed image") can be generated (Ren. Ng et al., "Light Field Photography with a Hand-Held Plenoptic Camera", Stanford University Computer Science Tech Report CTSR, 2005-02; Todor Georgiev and Andrew Lumsdaine, "Superresolution with Plenoptic 2.0 Camera", Signal Recovery and Synthesis, Optical Society of America, 2009).

Meanwhile, there are techniques that apply different types of image processing to image signals output when shooting using an image capturing apparatus, depending on the scene that was shot, the purpose of the shooting, and so on. For example, one technique employed when using a charge-accumulation type photoelectric conversion element as the image sensor involves reading out a charge accumulated during exposure when the charge has saturated and executing the exposure again in order to obtain image signals corresponding to multiple charge readouts, and the image signals are then combined to enhance the dynamic range (see Japanese Patent Laid-Open No. 59-34772).

However, a method for usefully processing multiple pieces of LF data obtained through multiple exposures based on the scene that was shot, the purpose of the shooting, or the like when generating a reconstructed image using LF data as described in the aforementioned Non-patent Documents 1 and 2 has not yet been proposed.

SUMMARY OF THE INVENTION

The present invention was made in view of such problems in the conventional technique. The present invention provides an image processing apparatus, an image capturing apparatus, a control method, and a recording medium for generating a favorable reconstructed image based on a scene that was shot, the purpose of the shooting, or the like from a plurality of pieces of LF data obtained through time-division exposure.

According to one aspect of the present invention, there is provided an image processing apparatus comprising: an obtainment unit that obtains a plurality of images obtained by shooting the same subject at different positions, at each of a plurality of timings; a first detection unit that detects a phase difference between the images obtained at the same timing; a second detection unit that detects a phase difference between the images obtained at the same position but at different timings; a generating unit that generates an output image by synthesizing at least some of the images obtained by the obtainment unit so that at least one of the phase differences detected by the first detection unit and the second detection unit is eliminated; and a setting unit that sets a generation condition for the output image generated by the generating unit, wherein the generating unit generates the output image by selecting the images to use in the synthesis and the phase difference to be eliminated based on information of the generation condition for the output image set by the setting unit.

According to another aspect of the present invention, there is provided an image capturing apparatus comprising: a shooting unit that shoots the same subject at different positions at each of a plurality of timings and outputs a plurality of images obtained through the shooting; a first detection unit that detects a phase difference between the images obtained at the same timing output by the shooting unit; a second detection unit that detects a phase difference between the images obtained at the same position but at different timings output by the shooting unit; a generating unit that generates an output image by synthesizing at least some of the images output by the shooting unit so that at least one of the phase differences detected by the first detection unit and the second detection unit is eliminated; and a setting unit that sets a generation condition for the output image generated by the generating unit, wherein the generating unit generates the output image by selecting the images to use in the synthesis and the phase difference to eliminated based on information of the generation condition for the output image set by the setting unit.

According to still another aspect of the present invention, there is provided a control method for an image processing apparatus, the method comprising: an obtainment step of an obtainment unit in the image processing apparatus obtaining a plurality of images obtained by shooting the same subject at different positions, at each of a plurality of timings; a first detection step of a first detection unit in the image processing apparatus detecting a phase difference between the images obtained at the same timing; a second detection step of a second detection unit in the image processing apparatus detecting a phase difference between the images obtained at the same position but at different timings; a generating step of a generating unit in the image processing apparatus generating an output image by synthesizing at least some of the images obtained in the obtainment step so that at least one of the phase differences detected in the first detection step and the second detection step is eliminated; and a setting step of a setting unit in the image processing apparatus setting a generation condition for the output image generated in the generating step, wherein in the generating step, the generating unit generates the output image by selecting the images to use in the synthesis and the phase difference to eliminated based on information of the generation condition for the output image set in the setting step.

According to still yet another aspect of the present invention, there is provided a control method for an image capturing apparatus, the method comprising: a shooting step of a shooting unit in the image capturing apparatus shooting the same subject at different positions at each of a plurality of timings and outputting a plurality of images obtained through the shooting; a first detection step of a first detection unit in the image capturing apparatus detecting a phase difference between the images obtained at the same timing output in the shooting step; a second detection step of a second detection unit in the image capturing apparatus detecting a phase difference between the images obtained at the same position but at different timings output in the shooting step; a generating step of a generating unit in the image capturing apparatus generating an output image by synthesizing at least some of the images output in the shooting step so that at least one of the phase differences detected in the first detection step and the second detection step is eliminated; and a setting step of a setting unit in the image capturing apparatus setting a generation condition for the output image generated in the generating step, wherein in the generating step, the generating unit generates the output image by selecting the images to use in the synthesis and the phase difference to eliminated based on information of the generation condition for the output image set in the setting step.

Further features of the present invention will become apparent from the following description of exemplary embodiments (with reference to the attached drawings).

DESCRIPTION OF THE EMBODIMENTS

First Embodiment

Hereinafter, exemplary embodiments of the present invention will be described in detail with reference to the drawings. Some of the following embodiments describe examples of applying the present invention in a camera system, which serves as an example of an image processing apparatus, that includes an image capturing apparatus capable of obtaining a plurality of image signals obtained by shooting the same subject at the same time from different positions. However, the present invention can also be applied in any device capable of obtaining a plurality of image signals obtained by shooting the same subject at the same time from different positions.

Definitions of terms used in this specification will be given below.

"LF Data"

An image signal, output from an image capturing unit 102 provided in a digital camera 100 according to the present embodiment, to which a predetermined image process associated with developing an image has been applied. In the LF data, each pixel indicates a signal intensity corresponding to a light beam, and the combinations of split-pupil regions in an optical imaging system 202 through which the light beams have passed and the incident direction of the light beams are different from light beam to light beam. LF data is also referred to as ray space information.

"Reconstructed Image"

An image, generated from LF data, that focuses on a desired focal plane position. Specifically, this is an image obtained by positioning a plurality (a number corresponding to a number of pupil splits) of split-pupil images generated from pixels of the LF data passing through the same split-pupil region so that subject images generated at the focal depths match, and adding up (superimposing) the pixel values of corresponding pixels.

Camera System Configuration

Figure 1:
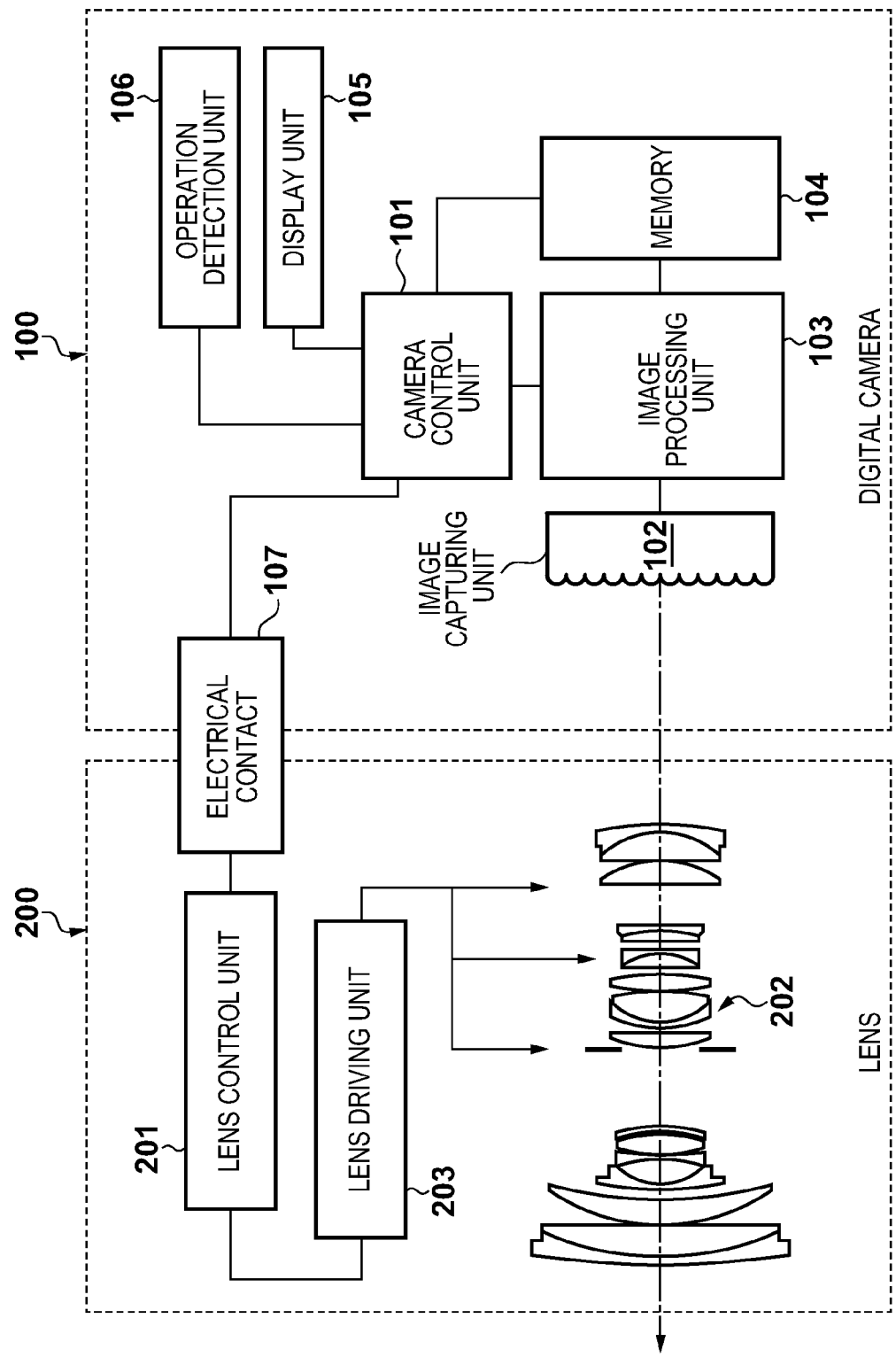
FIG. 1 is a block diagram illustrating the functional configurations of a digital camera 100 and a lens 200 included in a camera system according to an embodiment of the present invention.

FIG. 1 is a block diagram illustrating the functional configurations of the digital camera 100 and a lens 200 included in the camera system according to an embodiment of the present invention.

Configuration of Digital Camera 100

A camera control unit 101 is, for example, a CPU, and contains a ROM and a RAM (not shown). The camera control unit 101 controls operations of the blocks of the digital camera 100 by reading out operation programs corresponding to each block in the digital camera 100 from the ROM, expanding the programs in the RAM, and executing the programs. The camera control unit 101 also sends focal position information determined by analyzing an image signal output from the image capturing unit 102 and information of aperture values and the like that correspond to determined exposure settings to the lens 200 via an electrical contact 107.

An image capturing unit 102 is, for example, an image sensor such as a CCD, a CMOS sensor, or the like. Based on the exposure settings, image capturing unit 102 exposes and reads out the individual photoelectric conversion elements (pixels) in the image sensor based on timing signals generated by the camera control unit 101. The image capturing unit 102 then outputs an analog image signal corresponding to obtained RAW-LF data (that is, pre-development LF data) to the image processing unit 103. Specifically, the image capturing unit 102 outputs the analog image signal by performing photoelectric conversion on an optical image formed on a light-receiving surface of the image sensor by the optical imaging system 202 of the lens 200.

Figure 2A:
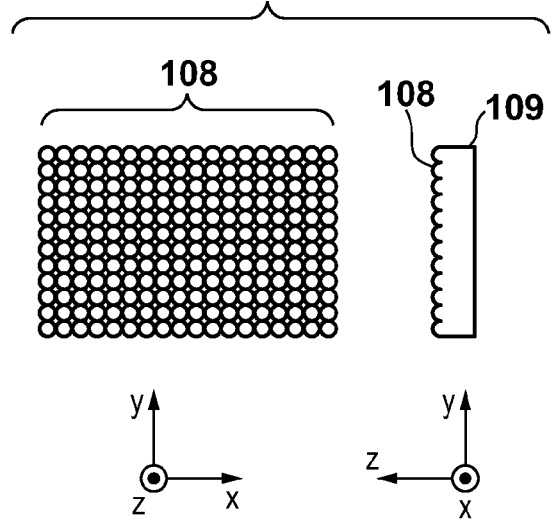
FIGS. 2A, 2B, and 2C are diagrams illustrating, in detail, the configuration of an image capturing unit 102 according to an embodiment of the present invention.

In the digital camera 100 according to the present embodiment, a microlens array 108 in which microlenses 20 are arranged in a grid-shaped pattern as shown in FIG. 2A is installed on the surface of an image sensor 109. One of the microlenses 20 in the microlens array 108 is associated with a plurality of photoelectric conversion elements (pixels) in the image sensor 109, as shown in FIG. 2B. Light beams entering via the optical imaging system 202 of the lens 200 are formed by the microlenses 20 on the corresponding pixels of the image sensor 109, a process that results in pupil splitting. In other words, light beams that have passed through split-pupil regions of the optical imaging system 202 that correspond to associated pixel positions are formed on each associated pixel in the image sensor 109. In the example shown in FIG. 2B, 5×5, or 25, pixels are associated with a single microlens 20, and thus the number of pupil splits in the optical imaging system 202 is 25.

Figure 2C:
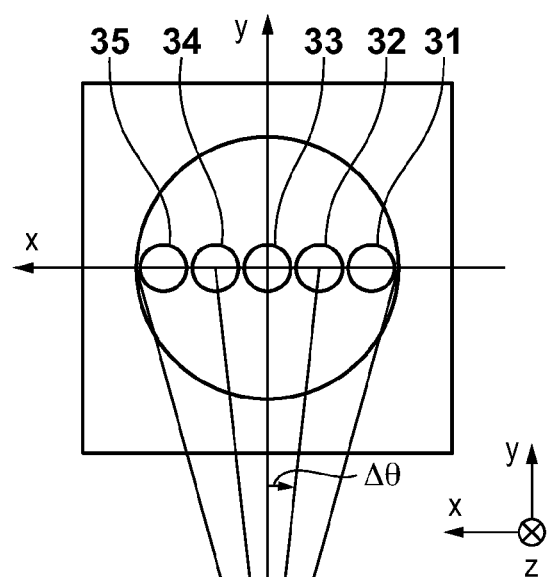
Figure 2B:
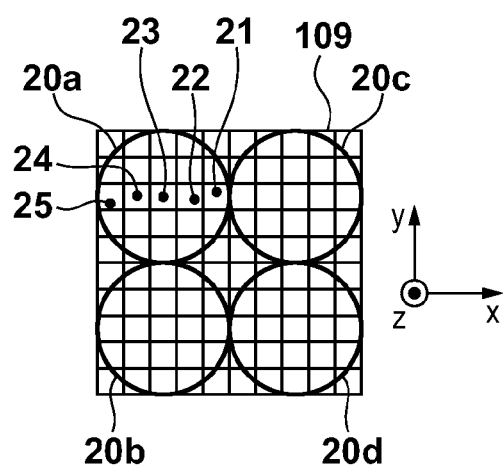

FIG. 2C is a diagram illustrating a correspondence relationship between the pixels associated with a single microlens and split-pupil regions in an exit pupil of the optical imaging system 202 through which light beams formed on the respective pixels pass. Note that in the example shown in FIG. 2C, it is assumed, for the sake of simplicity, that five pixels 21 to 25 are arranged in the horizontal direction relative to a single microlens 20, along a horizontal line that passes through the center of the microlens 20. Here, the design is such that due to the microlens 20, the respective pixels are in a conjugate relationship with split-pupil regions 31 to 35 on the exit pupil surface. In the example shown in FIG. 2C, the pixel 21 is in a conjugate relationship with the split-pupil region 31, the pixel 22 with the split-pupil region 32, the pixel 23 with the split-pupil region 33, the pixel 24 with the split-pupil region 34, and the pixel 25 with the split-pupil region 35.

The image processing unit 103 executes predetermined image processing, including processing related to developing, on the analog image signal of the RAW-LF data output from the image capturing unit 102. Specifically, the image processing unit 103 performs A/D conversion processing, white balance adjustment processing, gamma correction processing, demosaic processing, and the like on the input analog image signal. Note that in the present embodiment, the image processing unit 103 also performs a process for generating a reconstructed image from the obtained LF data. The image processing unit 103 also executes compression processing according to a predetermined encoding standard on the RAW-LF data, LF data, reconstructed image, and data such as audio generated through the respective steps mentioned above. Furthermore, the image processing unit 103 also records the RAW-LF data, LF data, reconstructed image, and data such as audio generated through the respective steps mentioned above into a memory, a recording medium, or the like, or converts the stated data into predetermined formats and outputs the data to the exterior, in accordance with an operational mode, user instructions, or the like. The various types of image processes may be realized by dedicated circuits or the like.

A memory 104 includes a storage device and a processing circuit for reading from and writing to the storage device. The memory 104 outputs data to the storage device and stores images to be output to a display unit 105. The memory 104 also stores encoded images, moving pictures, audio data, and so on.

The display unit 105 is a display device such as an LCD that is provided in the digital camera 100. Reconstructed images generated from the LF data obtained through shooting and the like are displayed in the display unit 105.

An operation detection unit 106 detects operations made through a user interface such as a release button and the like provided in the digital camera 100. Specifically, upon detecting that the release button, for example, has been manipulated by a user, the operation detection unit 106 outputs a control signal corresponding to that operation to the camera control unit 101.

Configuration of Lens 200

A lens control unit 201 is, for example, a CPU, and contains a ROM and a RAM (not shown). The lens control unit 201 controls the operations of respective blocks provided in the lens 200 by reading out operating programs for those blocks that are stored in the ROM, expanding the programs in the RAM, and executing the programs. Upon receiving information such as a focal position, an aperture value, or the like from the camera control unit 101 via the electrical contact 107, the lens control unit 201 transfers the information to a lens driving unit 203 and causes corresponding optical members in the optical imaging system 202 to be driven.

The optical imaging system 202 is configured of a lens group, an aperture, and the like provided in the lens 200. In the present embodiment, the optical imaging system 202 includes at least a focus lens, a shift lens, and an aperture. In accordance with information input from the lens control unit 201, the lens driving unit 203 controls the driving of the focus lens, the shift lens, and the aperture of the optical imaging system 202. Note that a camera shake detection sensor (not shown) is connected to the lens control unit 201 in the present embodiment, and the lens driving unit 203 drives the shift lens in accordance with an output from that sensor that has been input into the lens control unit 201.

Configuration Related to Process for Generating Reconstructed Image

Hereinafter, a configuration of the image processing unit 103 according to the present embodiment that is related to the process for generating the reconstructed image will be described using FIG. 3. Although FIG. 3 illustrates an example in which the configuration related to the process for generating the reconstructed image is realized as hardware, the configuration may be implemented as software when carrying out the present invention.

Figure 3:
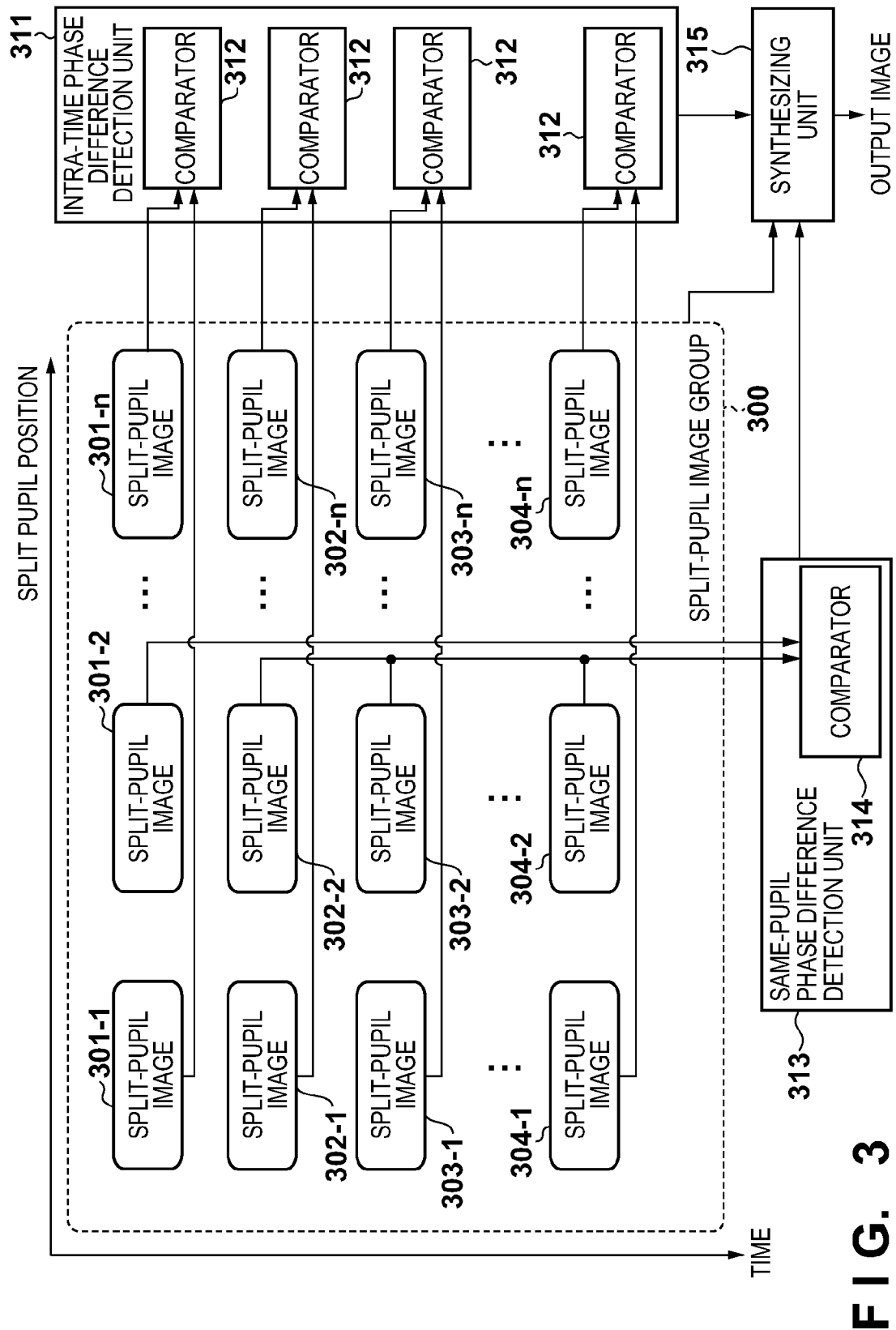
FIG. 3 is a diagram illustrating a hardware configuration, related to a process for generating a reconstructed image, in an image processing unit 103, according to a first embodiment of the present invention.

In FIG. 3, split-pupil images 301-1 to 301-n each indicates an image generated from LF data shot at the same time. In the process for generating a reconstructed image according to the present embodiment, the image processing unit 103 links the LF data based on the positional relationships of pixels corresponding to light beams passing through the same split-pupil region, and generates a number of images equivalent to the number of pupil divisions (that is, split-pupil images). In other words, the image processing unit 103 according to the present embodiment generates, from the pixels in the image sensor associated with the respective microlenses in the microlens array 108, a number of split-pupil images equivalent to the number of pupil divisions by linking respective image signals output by pixels in the same relative positional relationships as the microlenses. Specifically, in the example shown in FIG. 2B, 5×5 pixels associated with respective microlenses 20a, b, c, and d are classified into coordinates such as (1,1), (1,2), and so on up to (5,5), and the split-pupil images are generated from the LF data using only the pixels classified into the same coordinates. In other words, in the example shown in FIG. 2B, 25 types of split-pupil images are generated. In the example shown in FIG. 3, the split-pupil images generated from the LF data shot at the same time are indicated with identifier numbers 1 to n, and in the example shown in FIG. 2B, n=25. The split-pupil images generated in this manner correspond to images that have passed through different split-pupil regions, and thus are images obtained by shooting the same subject at the same time from different positions.

Although the present embodiment describes a number of split-pupil images equivalent to the number of pixels associated with a single microlens 20 in the microlens array 108 as being generated, the number of split-pupil images that are generated is not limited thereto. For example, of the pixels associated with a single microlens 20, the pixel values of a plurality of adjacent pixels may be totaled, and each split-pupil image may then be generated. Specifically, in the example shown in FIG. 2B, 2×2 pixel groups having coordinates such as (1,1), (1,2), (2,1), and (2,2) may be classified, and 4×4, or 16, types of split-pupil images may be generated from pixel groups classified by the same coordinates. Alternatively, split-pupil images corresponding to all split-pupil regions may not be generated depending on the application, as will be described later.

Meanwhile, in FIG. 3, split-pupil images 301 to 304 indicate images generated from LF data shot at different times, ordered in time series. Although the present embodiment describes a process where the digital camera 100 shoots a plurality of times in time-division and a reconstructed image occurring when a plurality of pieces of LF data are present is generated, the present invention can also be applied to LF data obtained from a single shot.

Based on the scene that has been shot, the application, and so on, a synthesizing unit 315 selects split-pupil images from the plurality of split-pupil images generated from the plurality of pieces of LF data (that is, a split-pupil image group 300), and generates the reconstructed image by synthesizing the selected split-pupil images.

Note that when generating the reconstructed image, the synthesizing unit 315 performs the synthesis having positioned the plurality of split-pupil images based on subject images present at a focal depth to be focused at, so that the subject images overlap with no phase difference. The image processing unit 103 according to the present embodiment obtains, from an intra-time phase difference detection unit 311 and a same-pupil phase difference detection unit 313, information of phase differences between respective split-pupil images necessary for the positioning carried out during the synthesis.

Phase Difference Detection Between Split-Pupil Images

The intra-time phase difference detection unit 311 and the same-pupil phase difference detection unit 313 include a comparator 312 and a comparator 314, respectively, that detect a phase difference between two images that have been input. Two split-pupil images converted into luminance images are input into each comparator. Here, operations performed by the comparator 312 or 314 will be described in detail using FIGS. 4A to 4D.

Figure 4A:
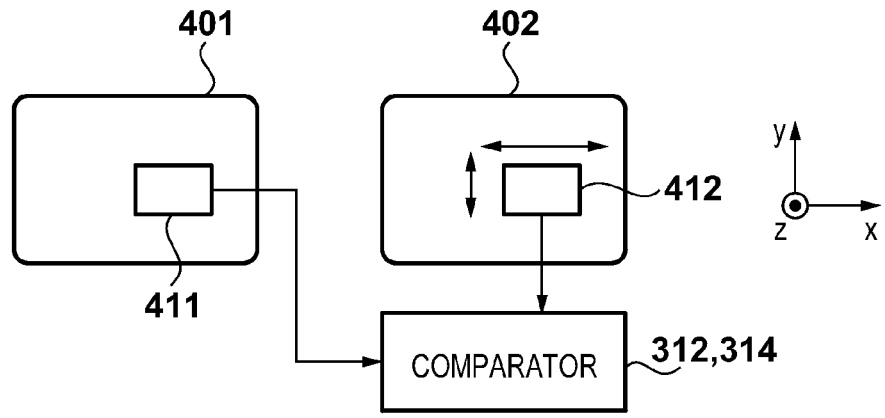
FIGS. 4A, 4B, 4C, and 4D are diagrams illustrating a hardware configuration for detecting a phase difference between luminance images according to an embodiment of the present invention.
Figure 4B:
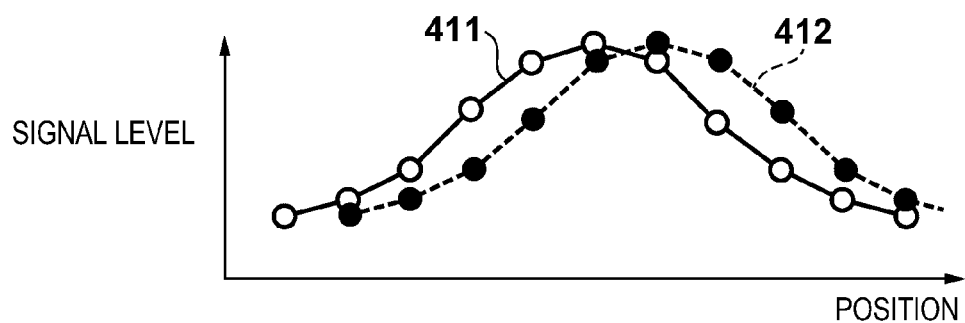
Figure 4C:
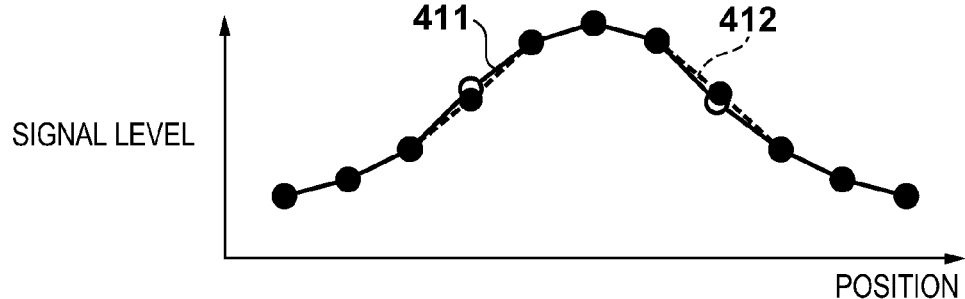
Figure 4D:
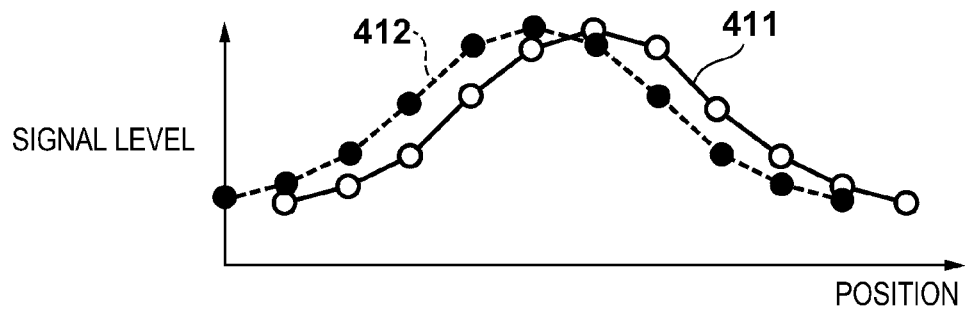

As shown in FIG. 4A, a luminance image of interest 401 and another luminance image 402 that are to be compared are input into the comparator. The comparators search for in what position each of regions obtained by dividing the luminance image of interest 401 is present in the other luminance image 402 while changing the phase, or in other words, while moving the region that is the target of the comparison. FIGS. 4B, 4C, and 4D respectively illustrate skew in a signal level distribution between the luminance image of interest 401 and the other luminance image 402 along a line in a search direction, when searching is carried out while changing the phase. The search target region illustrated in FIG. 4C indicates an example of a case where there is a small amount of variance due to the influence of noise but it is nevertheless determined that the phases of the luminance image of interest 401 and the other luminance image 402 match. Note that even in the case where the phases match as shown in FIG. 4C, a phenomenon in which slight differences arise in the signal level distributions is caused by the split-pupil regions corresponding to the images being different, the influence of noise and the like, and so on.

In the present embodiment, the intra-time phase difference detection unit 311 detects a phase difference among split-pupil images generated from LF data shot at the same time (a first detection). Meanwhile, the same-pupil phase difference detection unit 313 detects a phase difference among split-pupil images generated from LF data shot at different times (a second detection).

A set of the split-pupil images on which the comparator 312 of the intra-time phase difference detection unit 311 carries out the phase difference detection may be limited to, for example, images in a relationship where the split-pupil regions through which the light beams pass are in the same horizontal position or the same vertical position. Specifically, the images classified in FIG. 2B into the coordinates (1,1) and (1,5), or the images classified into the coordinates (1,1) and (5,1), may be taken as targets for comparison. These images are images in a relationship having horizontal disparity and vertical disparity, respectively.

Note that if the phase difference in one set of split-pupil images shot at the same time is determined for both the horizontal direction and the vertical direction, phase differences in other sets can be estimated as well. This is because based on the principle of triangulation, the phase difference between subject images taken of the same object is proportional to the amount of divergence in the direction of the line of sight between the respective split-pupil images. Specifically, assume that, for example, there is two pixels' worth of phase difference in the subject image between the split-pupil images corresponding to the light beams that have passed through the split-pupil regions 32 and 34 in FIG. 2C. In this case, the phase difference in the subject image arising between the split-pupil images corresponding to the light beams that have passed through the split-pupil regions 32 and 33 can, due to the distance between the split-pupil regions on the exit pupil surface being half the distance between the split-pupil regions 32 and 34, be estimated to be half as well, that is, one pixel's worth.

Furthermore, because epipolar constraint occurs between such selected images in a relationship having disparity, the search direction can be limited. In other words, for images in a relationship having horizontal disparity, the phase difference detection may be carried out on a region 412 in the other luminance image 402 having the same vertical coordinate as the region 411 to be searched in the luminance image of interest 401. Likewise, for images in a relationship having vertical disparity, the phase difference detection may be carried out on the region 412 in the other luminance image 402 having the same horizontal coordinate as the region 411 to be searched in the luminance image of interest 401.

Note that in the example shown in FIG. 3, the split-pupil images given identifier numbers 1 to n are input into the respective comparators 312 of the intra-time phase difference detection unit 311. However, in the case where the search direction limitation taking epipolar constraining into consideration is not performed, the configuration may be such that split-pupil images in a relationship having horizontal disparity or vertical disparity are not input into the comparators 312.

On the other hand, the set of split-pupil images on which phase difference detection is to be performed by the comparator 314 of the same-pupil phase difference detection unit 313 is limited to images corresponding to light beams that have passed through the same split-pupil region. This is so as to detect which position the subject image has moved in as time passes. To rephrase, this is because it is necessary to detect, under identical conditions (split-pupil regions), changes in the relative position of the subject image within the images caused by the influence of camera shake, image blur, and so on. In the example shown in FIG. 3, split-pupil images having an identifier number of 2 are input into the comparator 314 of the same-pupil phase difference detection unit 313. Meanwhile, although the split-pupil image to serve as the luminance image of interest 401 is a split-pupil image 301-2, it should be clear that the invention is not intended to be limited thereto.

As shown in FIG. 4A, for example, the comparators search for a position where the phase difference is minimum while moving the region 412 from the same position in the other luminance image 402 as the region 411 of the luminance image of interest 401, in at least one of the x direction and the y direction. Searching for the position where the phase difference is minimum may be carried out by, for example, searching for a location where a sum of absolute difference (SAD) is minimum. Assuming that a pixel in the region 411 of the luminance image of interest 401 is A(i,j) and a pixel in the region 412 to be searched in the other luminance image 402 as set in a position moved from the coordinates of the region 411 by Δx in the x direction is B(i+Δx,j), the SAD can be calculated as follows:

$$SAD(\Delta x) = \sum_i |A(i, j) - B(i + \Delta x, j)|$$

Here, the value of Δx where the SAD is minimum corresponds to the minimum phase difference. Note that the searching need not be carried out on a pixel-by-pixel basis.

Meanwhile, in the case where the searching is to be carried out regardless of epipolar constraint, and assuming a pixel in the region 412 to be searched in the other luminance image 402 as set in a position moved from the coordinates of the region 411 by Δx in the x direction and Δy in the y direction is B(i+Δx,j+Δy), the SAD can be calculated as follows:

$$SAD(\Delta x, \Delta y) = \sum_i \sum_j |A(i, j) - B(i + \Delta x, j + \Delta y)|$$

Furthermore, searching for the position where the phase difference is minimum may be carried out by searching for a location where a sum of squared difference (SSD) is minimum. In the case where the search direction is to be limited due to epipolar constraint, SSD can be calculated as follows:

$$SSD(\Delta x) = \sum_i (A(i, j) - B(i + \Delta x, j))^2$$

Meanwhile, in the present embodiment, the luminance images are generated by extracting pixels, one at a time, from pixel groups assigned to each microlens 20. The luminance images generated in this manner correspond to light beams obtained in what is known as a narrower aperture, where the light beams pass through limited split-pupil regions obtained by dividing the optical imaging system 202 into the same number as there are pixels assigned to the microlens 20. In other words, because the depth of field is deep, phase differences can be detected for subject images present at a variety of focal depths. However, the luminance images generated for detecting phase differences for each subject are not limited thereto when carrying out the present invention, and luminance images corresponding to at least two types of split-pupil regions may be used in the phase difference detection.

Figure 5A:
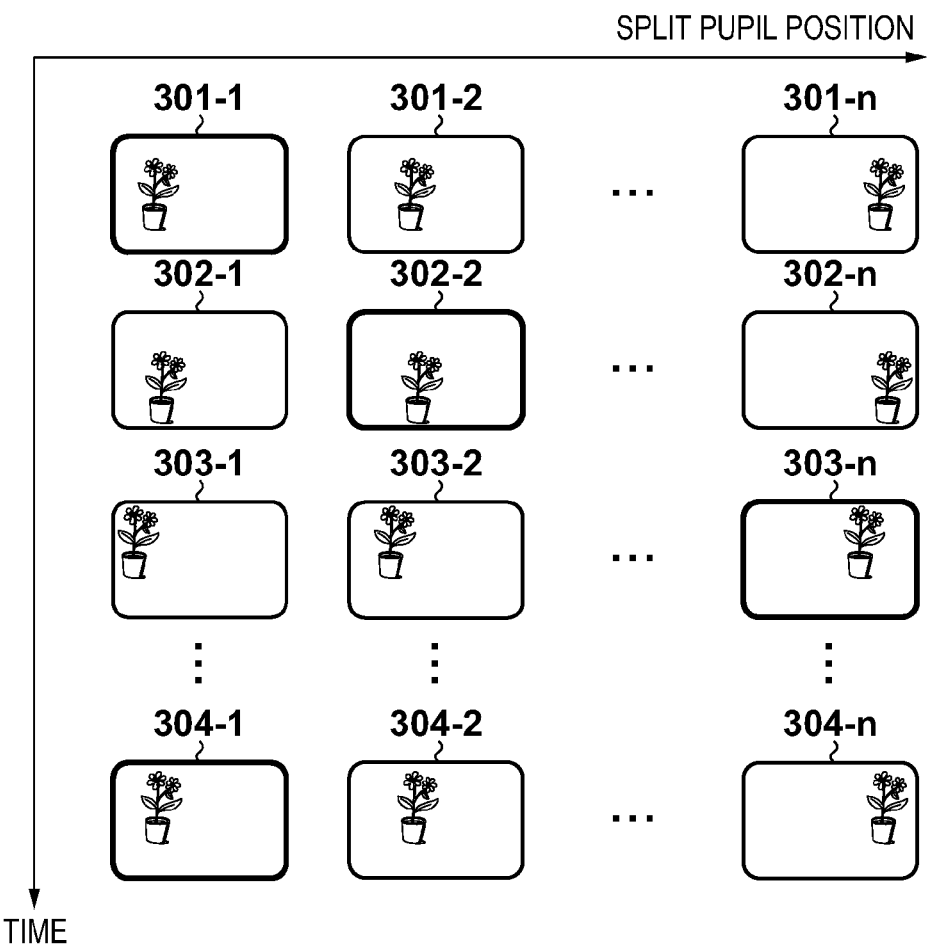
FIGS. 5A and 5B are diagrams illustrating an example of the generation of a reconstructed image according to an embodiment of the present invention.
Figure 5B:
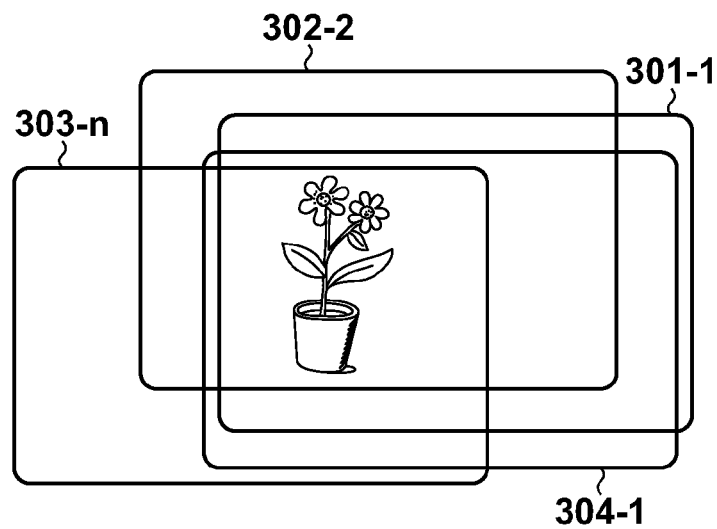

Based on the phase difference in the subject image between the split-pupil images obtained in this manner, the synthesizing unit 315 positions the subject image, focuses on the subject, and generates the reconstructed image. For example, in the case where the split-pupil images are as shown in FIG. 5A and the images indicated by the bold frames are to be used in the synthesis, the synthesizing unit 315 positions and synthesizes the images as indicated in FIG. 5B based on the phase difference for the subject image in those images. Doing so makes it possible for the synthesizing unit 315 to output a reconstructed image of a potted plant as a subject having little image blur or defocus.

Method for Selecting Split-Pupil Images

Next, a method through which the split-pupil images used by the synthesizing unit 315 to generate the reconstructed image, based on the scene that has been shot, the application, and so on are selected will be described with reference to FIGS. 6A to 6G. In FIGS. 6A to 6G, like the split-pupil images illustrated in FIG. 3, split-pupil images generated from LF data shot at the same time are given the same reference numerals, and reference numerals 1 to n are provided to identify the corresponding split-pupil region. Different reference numerals 601 to 604 are given to the split-pupil images generated from LF data shot at different times. In FIGS. 6A to 6G, the split-pupil images used by the synthesizing unit 315 to generate the reconstructed image are indicated with hatching.

Low-Light Scenes

In low-light scenes, it is necessary to increase the exposure amount in order to obtain an image in which the subject appears bright. However, increasing the exposure time of a single shot in order to increase the exposure amount results in the influence of camera shake, which in turn causes the image to blur. Generally speaking, in the case where the exposure time has become longer than the inverse of the focal depth of the optical imaging system 202, the influence of shaking will be felt during the exposure involved in a single shot. Accordingly, a typical image capturing apparatus employs a method of shooting images that ensure a bright subject image while reducing blur by taking a plurality of shots that each have exposure times shorter than the inverse of the focal depth of the optical imaging system 202 and synthesizing the obtained plurality of images (electronic image stabilization).

However, because electronic image stabilization takes a plurality of exposures in sequence, operations for adjusting the focal point and so on cannot be carried out during the exposure. In other words, with a conventional image capturing apparatus that does not record by performing pupil division on the light beams as in the present invention, in the case where the image capturing apparatus has moved forward or backward (that is, has moved in the depth direction toward or away from the subject) during the plurality of exposures, the size of a primary subject will differ from image to image in the images to be synthesized. Alternatively, the image of the primary subject will not be in focus, resulting in a blurry image. In other words, in the case where such a change has occurred in the images, a favorable image cannot be obtained even if the stated images are synthesized.

On the other hand, in the case where pupil division is carried out on the light beam and LF data is recorded as in the present invention, an image where the focus is on a given focal point can be generated from the LF data. In other words, even if the digital camera 100 has moved forward or backward during the plurality of exposures, the image of the primary subject in the split-pupil image at a deep depth of field will not blur, and thus the primary subject can be focused on in a favorable manner and an image not susceptible to the influence of blur can be generated.

Figure 6A:
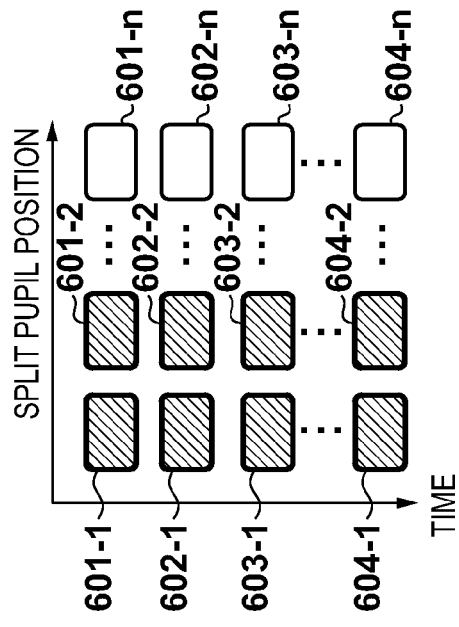
FIGS. 6A, 6B, 6C, 6D, 6E, 6F, and 6G are diagrams illustrating images used in the generation of a reconstructed image according to an embodiment of the present invention.
Figure 6B:
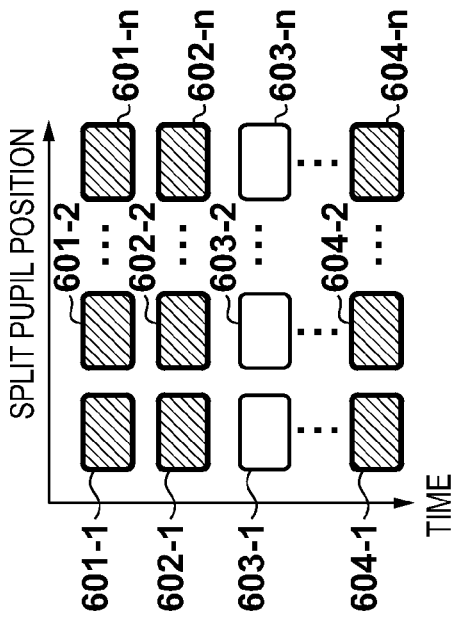

For this reason, in the case where a state in which a low-light scene will be shot by hand has been detected, the image processing unit 103 uses all or many of the split-pupil images generated from the LF data shot at different times in order to generate the reconstructed image, as indicated in FIG. 6A. Accordingly, by positioning and combining all of the split-pupil images from the same time, the same effect as when the aperture of the optical imaging system 202 is large, such as when the depth of field is shallow, can be achieved in the reconstructed image. Meanwhile, by positioning and combining a plurality of split-pupil image from different times, the same effect as when the state of focus of the primary subject changes during exposure and is tracked and synthesized can be achieved in the reconstructed image. In other words, even with a scene where blur in the forward and backward directions will be problematic, such as macro shooting, it is possible to obtain a reconstructed image having a favorable brightness and that keeps a favorable state of focus. It should be noted that tracking blur in the forward and backward directions is not limited to low-light scenes, and the same effects can be achieved in the case where split-pupil images from different times are used in the synthesis.

Long Exposure Shooting

When shooting a scene where water is flowing from a fountain or the like, there are cases where it is desirable to generate an image that extends in the time direction, and thus long exposure shooting (where the exposure time is long) is used in a typical image capturing apparatus in such a case. Furthermore, it is preferable to deepen the depth of field particularly when shooting landscape scenes. When shooting in such a manner, it is necessary to adjust the exposure amount increased by the long exposure. Normally, exposure control is carried out by deepening the depth of field and restricting the exposure by setting the aperture to a narrower state as well as applying a filter having a darkening effect such as an ND filter.

In the case where the light beams obtained through pupil division are recorded as in the present invention, limiting the split-pupil region when adding the split-pupil images generated from the LF data shot at different times makes it possible to achieve the same effects. Specifically, as shown, for example, in FIG. 6B, by totaling split-pupil images corresponding to limited split-pupil regions in the time direction, the same reconstructed image can be generated as when taking a long exposure shot of a landscape with a normal camera. In other words, the same effect as a narrower aperture can be achieved by limiting the split-pupil regions that are totaled, and split-pupil images at deep depths of field can be used in the synthesis with a low amount of light. Here, it is assumed that the split-pupil images given reference numerals 1 and 2 in FIG. 6B correspond to adjacent split-pupil regions.

Note that the method used for limiting the split-pupil regions and synthesizing the reconstructed images can also be used when generating images viewed from a specific direction.

Application: Enhancing State of Focus

When generating an image that enhances skew in the focal position or an image expressing where the focal position is located, of split-pupil images in a relationship where there is disparity in a given direction, images in which the amount of the disparity is comparatively high may be selected and synthesized.

Figure 6C:
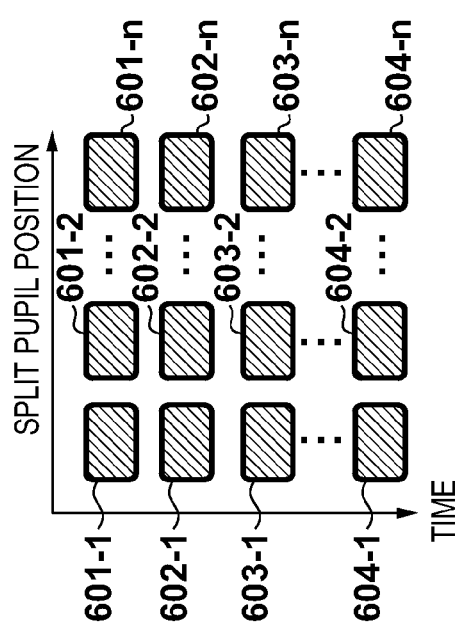

For example, when generating an image that enhances focal position skew for subjects aside from the primary subject, the split-pupil images corresponding to the light beams that have passed through the split-pupil regions 31 and 35, respectively, in the example shown in FIG. 2C, may be used to generate the reconstructed image, as shown in FIG. 6C. Here, a reconstructed image that enhances the image skew for subjects aside from the primary subject can be generated by positioning the primary subject and totaling the split-pupil images that correspond to the split-pupil regions in the time direction so as to achieve an appropriate light amount. On the other hand, synthesizing images having relatively high disparity amounts without adjusting the phase difference makes it possible to generate a reconstructed image in which there is no phase difference in the subject image present at the focal position, as with a so-called degree of matching between two images. In other words, a reconstructed image in which the subject at which the focal position is present can be discerned can be generated.

Application: Motion Blur Elimination

With respect to low-light scenes, descriptions have been given regarding avoiding the influence of camera shake by restricting the exposure time of a single shot. However, in the case where the subject is an object traveling at high speeds, such as a vehicle, it is difficult to avoid the effects of image blur, or what is known as motion blur, even if the exposure time is restricted. By employing a technique called "coded exposure" in shooting scenes where such motion blur can occur, a motion function that causes the blur to arise can be analyzed and the blur can be eliminated. Specifically, in coded exposure, the exposure time is coded to a specific pattern, and the motion function of the moving subject is analyzed by analyzing the amount of blur resulting from each exposure time.

Figure 6D:
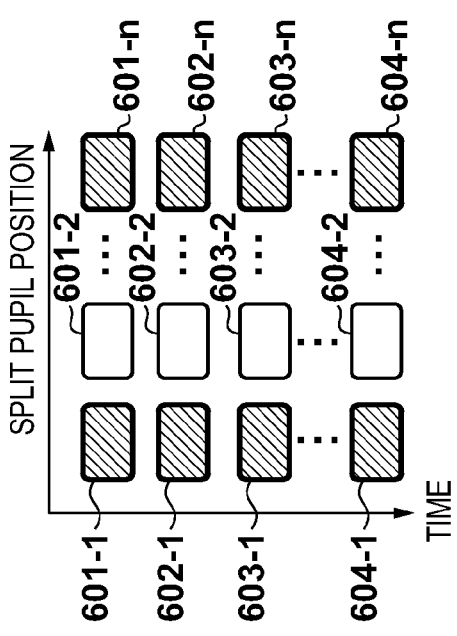

This type of technique can easily be implemented in the digital camera 100 according to the present invention as well. For example, in the case where motion blur has been detected in a split-pupil image, the same effect as coded exposure can be achieved by selecting split-pupil images shot at specific times as images to be used in the process for generating the reconstructed image, as indicated in FIG. 6D. In this case, time slots selected in sequence are grouped and split-pupil images are totaled for each group, and a reconstructed image that eliminates motion blur may be generated by using the images obtained as a result in the analysis. In the example shown in FIG. 6D, two images, namely an image generated by totaling split-pupil images 601-1 to n and split-pupil images 602-1 to n and an image generated by totaling the split-pupil images 604-1 to n, are used in the analysis. Note that in order to improve the accuracy of the analysis, it is preferable to increase the time resolution during the time-division shooting of LF data.

Short Exposure Shooting

Figure 6F:
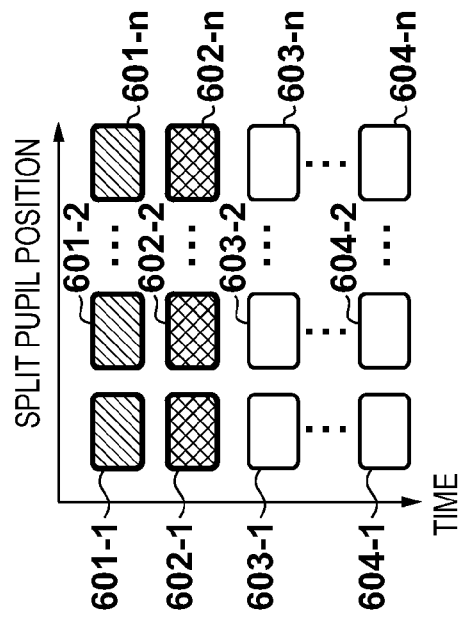
Figure 6E:
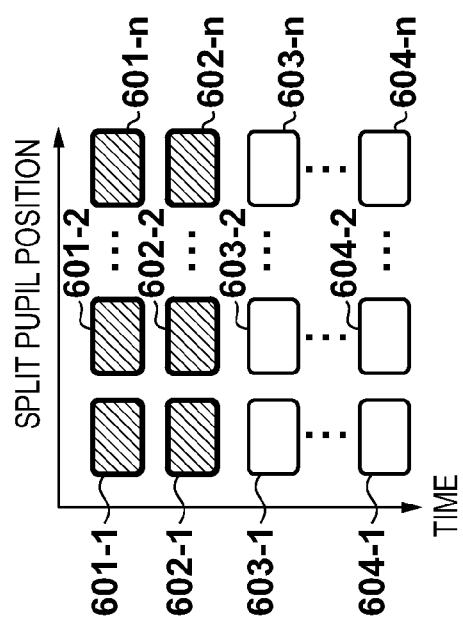
Figure 6G:
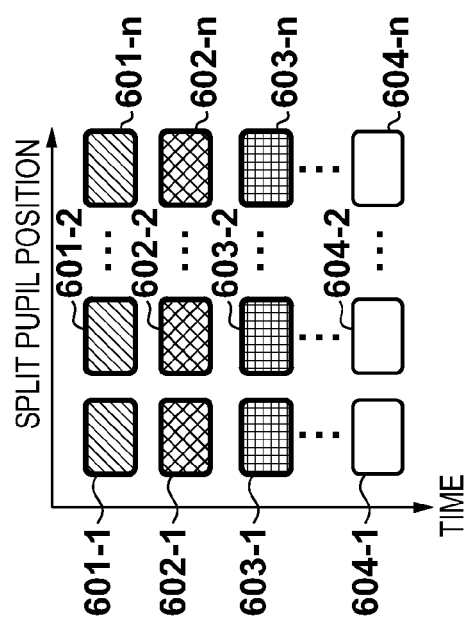

Conversely from the aforementioned long exposure shooting, there are applications where a specific time is to be cut out as an image without any time direction extension; in such applications, the split-pupil images used in the process for generating the reconstructed image may be restricted in the time direction, as shown in FIG. 6E. Here, many split-pupil images are selected from the same time in order to achieve a certain light amount, and those images are positioned and synthesized; as a result, a reconstructed image that focuses on the primary subject and in which the movement of the primary subject appears to have stopped can be generated.

Application: Dynamic Range Enhancement

By controlling the exposure amount during time-division shooting of LF data, a reconstructed image whose dynamic range has been enhanced can also be generated. In other words, underexposed LF data shot at a shorter time than a proper exposure time that serves as the proper exposure for time-division shooting and overexposed LF data shot at a longer time than the stated proper exposure time, may be obtained. That is, by using split-pupil images 601-1 to n generated from underexposed LF data and using split-pupil images 602-1 to n generated from overexposed LF data, a reconstructed image whose dynamic range is enhanced can be generated, as shown in FIG. 6F. Note that the split-pupil images 601 and the split-pupil images 602 are given different hatching patterns in FIG. 6F to indicate the different exposure times.

Application: White Balance Adjustment

In the case where the digital camera 100 includes a light projection unit such as a flash, the color of an object can be estimated by illuminating that object while changing the color of the projected light. Specifically, as indicated by the different hatching in FIG. 6G, during time-division shooting of the LF data, the exposure is carried out while changing the color of the projected light among R, G, and B. Then, all of the split-pupil images generated from the LF data obtained as a result of the respective exposures are synthesized and the color of the object is estimated from the obtained image, and this color is then used to adjust the white balance.

In this manner, using different exposure times for the time-division shooting, different methods for selecting the split-pupil images to be used in the process for generating the reconstructed image, and so on based on the scene to be shot, the application, and so on makes it possible for the image processing unit 103 according to the present embodiment to generate a favorable reconstructed image. Note that the embodiments of the present invention are not limited thereto; LF data may be configured in advance to be shot in time-division, and the reconstructed image may then be generated by appropriately processing a plurality of pieces of LF data based on a result of a post-recording scene analysis, a user's preferences, and the like. In this case, for example, the camera control unit 101 may control the operations of the image processing unit 103 having analyzed the scene in the LF data or judged instructions made by the user.

As described thus far, the image processing apparatus according to the present embodiment can generate a favorable reconstructed image from a plurality of pieces of LF data obtained through time-division exposure in accordance with the scene to be shot, the application, and so on. Specifically, the image processing apparatus obtains a plurality of images themselves obtained by shooting the same subject at different positions, at each of a plurality of timings. Then, a first phase difference between images obtained at the same time, and a second phase difference between images obtained by shooting at the same position but at different timings, are detected. The image processing apparatus then selects at least some of the obtained images as images to be used in the synthesis in accordance with a set generation condition, synthesizes the images so as to eliminate at least one of the first and second phase differences, and outputs the resulting image.

Second Embodiment

Figure 7:
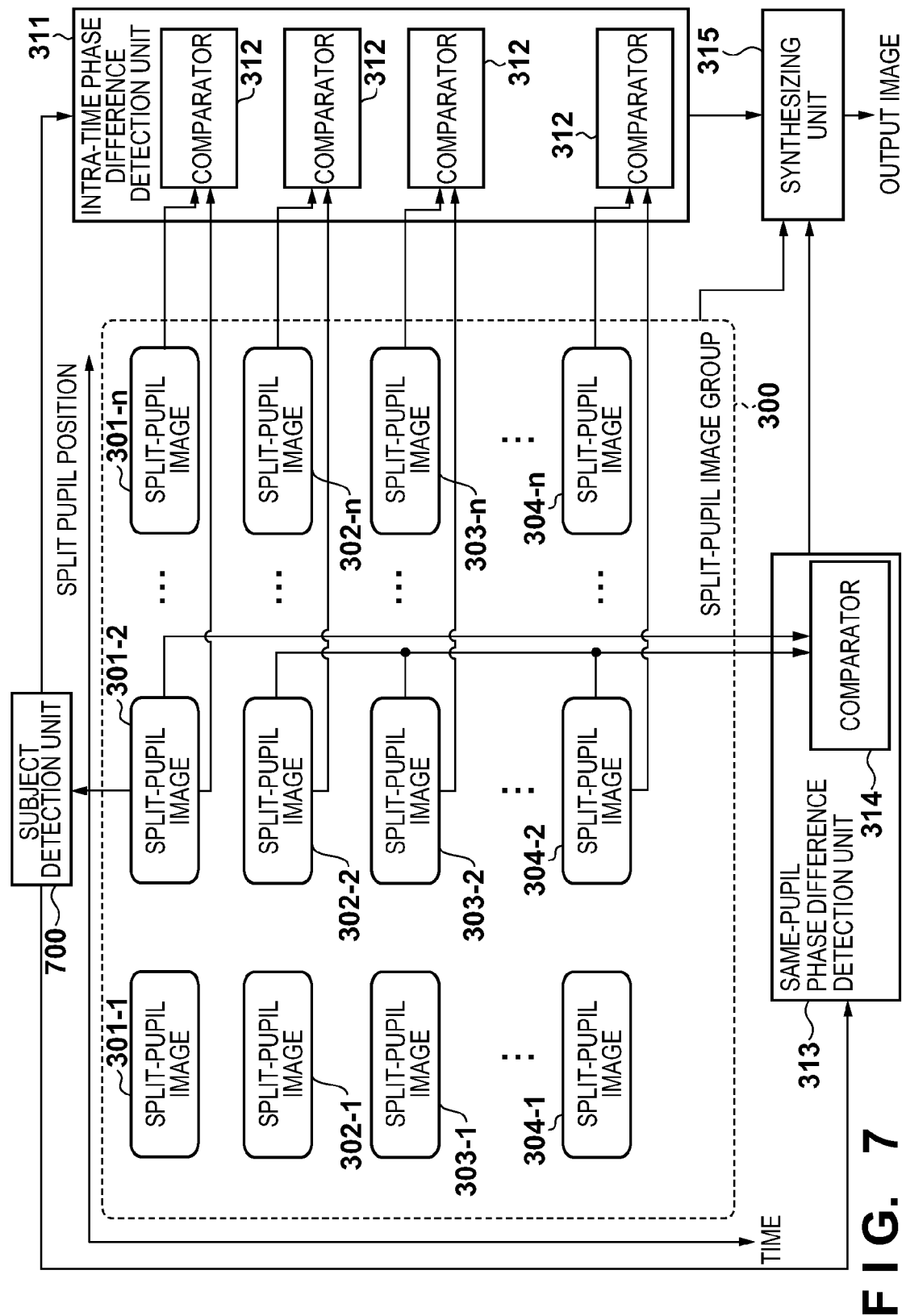
FIG. 7 is a diagram illustrating the hardware configuration, related to a process for generating a reconstructed image, in an image processing unit 103, according to a second embodiment of the present invention.

In the aforementioned first embodiment, the intra-time phase difference detection unit 311 and the same-pupil phase difference detection unit 313 obtain, as the phase difference of the primary subject, a phase difference obtained by performing detections on all regions in the split-pupil images. With the image processing unit 103 according to the present embodiment, however, a subject detection unit 700 that detects a phase difference for a specific subject such as a person's face is provided, as shown in FIG. 7.

For example, consider a case where a luminance image of interest for the comparators 312 of the intra-time phase difference detection unit 311 and the comparator 314 of the same-pupil phase difference detection unit 313 is taken as a luminance image in a split-pupil image assigned the reference numeral 2. At this time, the luminance image of interest is also input into the subject detection unit 700, and information of a subject position that has been detected is provided to the intra-time phase difference detection unit 311 and the same-pupil phase difference detection unit 313. By doing so, the comparators of the intra-time phase difference detection unit 311 and the same-pupil phase difference detection unit 313 need only detect the phase difference in regions corresponding to the position of the detected subject, which makes it possible to reduce the amount of processing.

Third Embodiment

Figure 8:
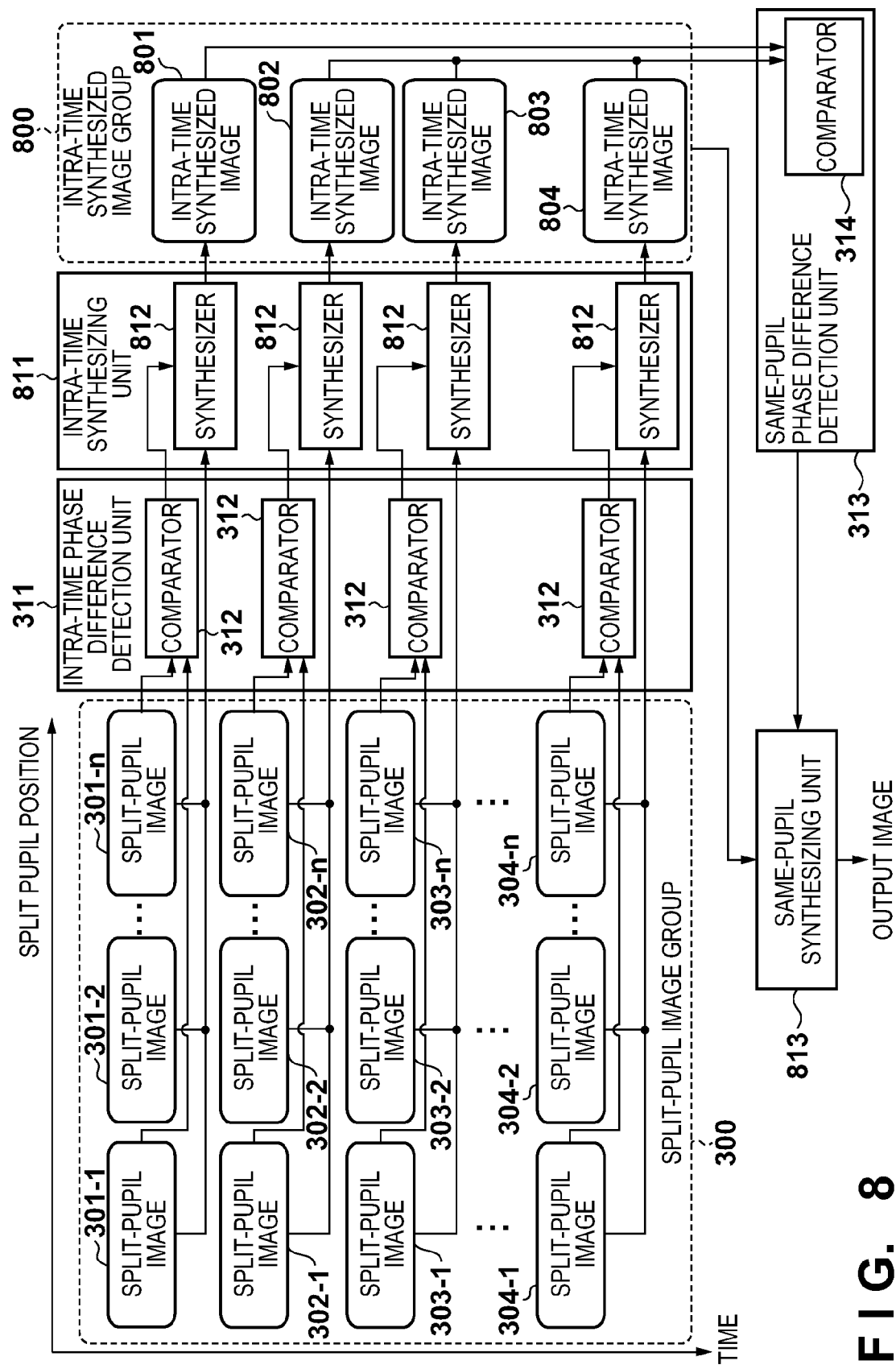
FIG. 8 is a diagram illustrating the hardware configuration, related to a process for generating a reconstructed image, in an image processing unit 103, according to a third embodiment of the present invention.

With the image processing unit 103 according to the present embodiment, the synthesizing unit 315 is, as shown in FIG. 8, divided into synthesizers 812 of an intra-time synthesizing unit 811, and a same-pupil synthesizing unit 813.

In the process of generating the reconstructed image according to the present embodiment, first, the intra-time phase difference detection unit 311 detects a phase difference among split-pupil images generated from LF data shot at the same time. Then, each synthesizer 812 in the intra-time synthesizing unit 811 synthesizes all of the split-pupil images generated from the LF data shot at each time, in accordance with the detected phase difference, and generates a synthesized image focusing on the primary subject for each time (that is, an intra-time synthesized image).

The comparator 314 of the same-pupil phase difference detection unit 313 detects a phase difference between the generated intra-time synthesized image. The intra-time synthesized image is an image that integrates the split-pupil regions from each time and corresponds to pupils having large apertures, and is thus a bright image with a shallow focus. In the image, the primary subject is in focus and has a high contrast, whereas the other subjects have low contrast, and thus the phase difference detection performed by the comparator 314 obtains a detection result that is highly accurate with respect to the primary subject. This is because the amount of change in the SAD, SSD, and so on is low in regions of low contrast, and the phase difference detection performed by the comparator 314 focuses on the primary subject as a result.

The same-pupil synthesizing unit 813 then synthesizes the intra-time synthesized images based on the phase difference detected by the comparator 314, and a favorable reconstructed image that focuses on the primary subject can be generated even if the digital camera 100 has moved forward or backward.

Fourth Embodiment

Figure 9:
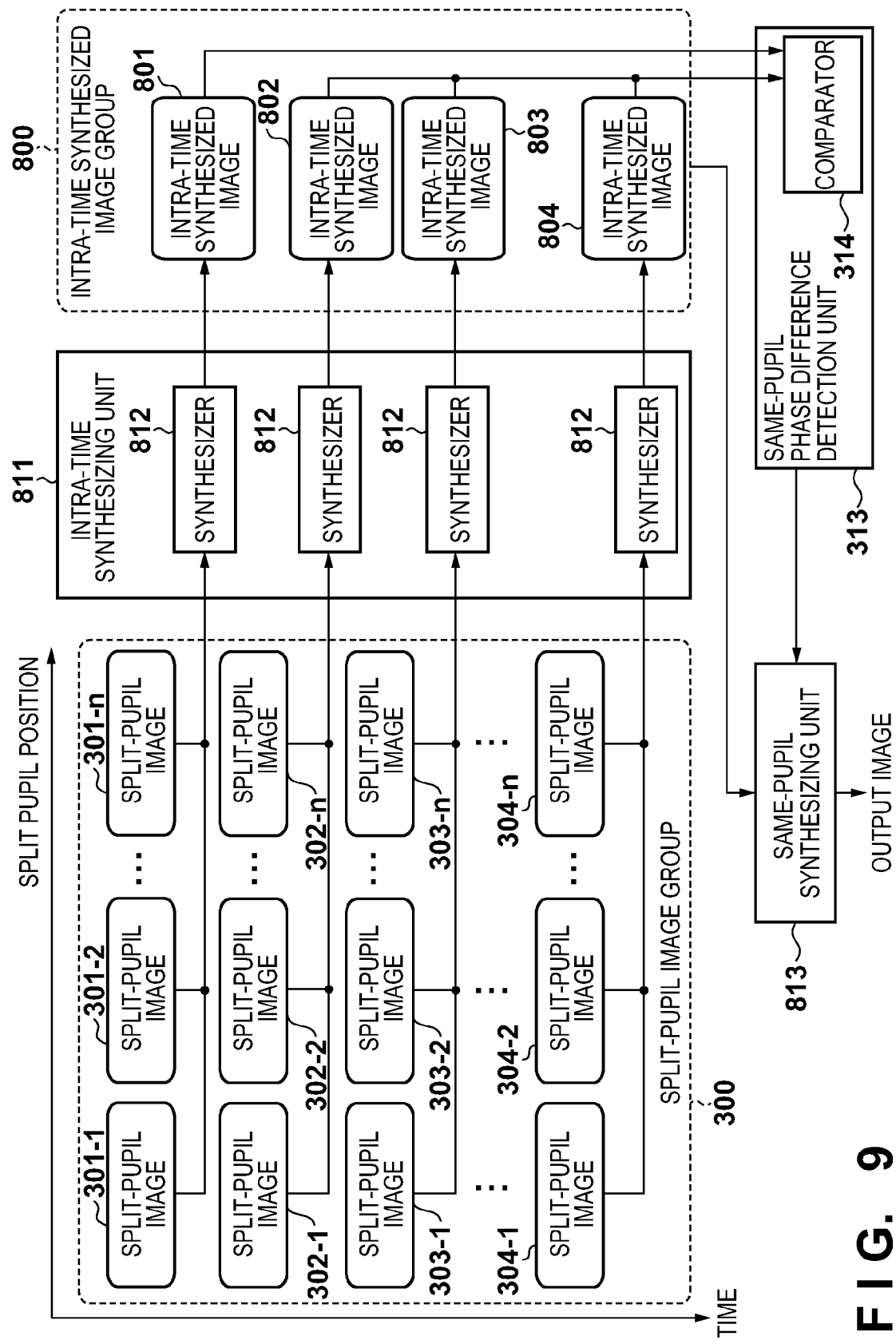
FIG. 9 is a diagram illustrating the hardware configuration, related to a process for generating a reconstructed image, in an image processing unit 103, according to a fourth embodiment of the present invention.

The image processing unit 103 according to the present embodiment differs from the configuration of the image processing unit 103 according to the third embodiment in that the intra-time phase difference detection unit 311 is not provided, as shown in FIG. 9. Phase difference detection is not performed on the split-pupil images generated from LF data shot at the same time; instead, the subject images are synthesized by the synthesizers 812 in the intra-time synthesizing unit 811 without being positioned, and are outputted as the intra-time synthesized images.

Employing such a configuration does not ensure that the primary subject will be focused on in the intra-time synthesized images, nor that subject blur caused by the digital camera 100 moving forward and backward will be reduced. However, it is possible to generate a reconstructed image that reduces the influence of skew in the subject images present at the focal position during shooting caused by the digital camera 100 moving.

Note that the present embodiment describes generating the intra-time synthesized image without carrying out positioning in the intra-time synthesizing unit 811. However, the invention is not limited thereto in the case where the digital camera 100 is provided with another unit capable of obtaining the focal position in each piece of the LF data aside from the intra-time phase difference detection unit 311. In other words, the image processing unit 103 can also generate the reconstructed image having tracked the focal position by performing the positioning in the intra-time synthesizing unit 811 using information of the focal positions obtained by the stated unit and generating the intra-time synthesized images.

Fifth Embodiment

The present embodiment describes a configuration of the image processing unit 103 related to the process for generating the reconstructed image in the case where an altered viewpoint image whose viewpoint has been altered using the shot LF data is to be confirmed later. The configuration of the image processing unit 103 according to the present embodiment differs from that in the third and fourth embodiments in that same-pupil synthesized images are generated first by synthesis in the time direction, after which the reconstructed image is generated by synthesizing the same-pupil synthesized images.

In the process for generating the reconstructed image according to the present embodiment, first, the same-pupil phase difference detection unit 313 detects phase differences among split-pupil images obtained at different times in each of the split-pupil regions. Then, each synthesizer 1012 in a same-pupil synthesizing unit 1011 synthesizes all of the split-pupil images generated from the LF data shot through each split-pupil region in accordance with the detected phase differences, and generates the same number of same-pupil synthesized images (intra-pupil synthesized images) as there are pupil divisions. The intra-pupil synthesized images are integrated (totaled) in the time direction but are not integrated (totaled) with respect to the pupil, and thus each image is an image seen from a different viewpoint.

Figure 10:
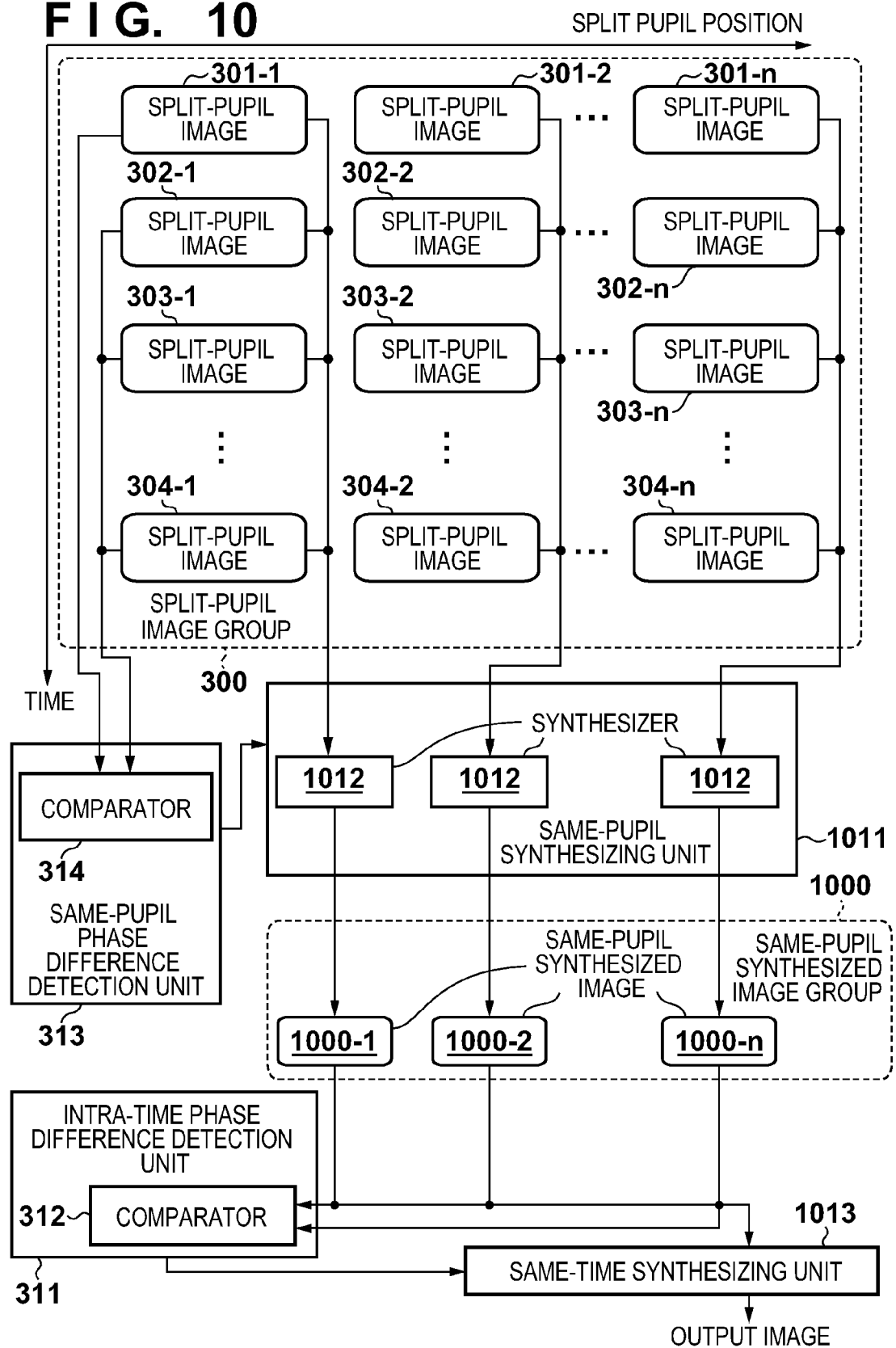
FIG. 10 is a diagram illustrating the hardware configuration, related to a process for generating a reconstructed image, in an image processing unit 103, according to a fifth embodiment of the present invention.

Meanwhile, as shown in FIG. 10, when detecting the phase differences in each split-pupil region, representative images 301-1, 302-1, and so on up to 304-1 are employed in the synthesis, and phase difference detection is not carried out with the other split-pupil regions. This is because camera shake is the main cause of phase differences arising between split-pupil images obtained at different times and angular blur is dominant in a typical state. In such a state, only a so-called compositional change occurs. The compositional change occurs in the same manner at each viewpoint (in each split-pupil region), and thus a sufficiently good approximation can be made by using the phase in a representative image to estimate the phase differences with the other images. Doing so makes it possible to reduce the calculation amount. The term "approximated" is used here because in the case where the digital camera 100 is undergoing translational motion due to camera shake, that component is ignored. Because subject movement within an image caused by translational motion differs depending on the distance, a favorable approximation is achieved for the primary subject, whereas a small amount of error arises in other subjects at different distances from the primary subject.

The comparator 312 of the intra-time phase difference detection unit 311 detects a phase difference between the generated intra-pupil synthesized images. Here, the blur is reduced for the primary subject. Because the depth of focus is deep, the primary subject also has a high contrast. Furthermore, when the blur contains a translational motion component, other subjects whose distances from the primary subject differ have low contrast, and thus the phase difference detection performed by the comparator 312 obtains a detection result that is highly accurate with respect to the primary subject. This is because the amount of change in the SAD, SSD, and so on is low in regions of low contrast, and the phase difference detection performed by the comparator 312 focuses on the primary subject as a result.

A same-time synthesizing unit 1013 then synthesizes the intra-time synthesized images based on the phase difference detected by the comparator 312, and a favorable reconstructed image that focuses on the primary subject can be generated even if the digital camera 100 has moved due to camera shake.

Sixth Embodiment

The present embodiment describes a configuration of the image processing unit 103 related to the process for generating the reconstructed image in the case where shooting is performed while the digital camera 100 is fixed using a tripod or the like, or in other words, in the case where there is no camera shake. The image processing unit 103 according to the present embodiment differs from the configuration of the image processing unit 103 according to the fifth embodiment in that the same-pupil phase difference detection unit 313 is not provided, as shown in FIG. 11.

Figure 11:
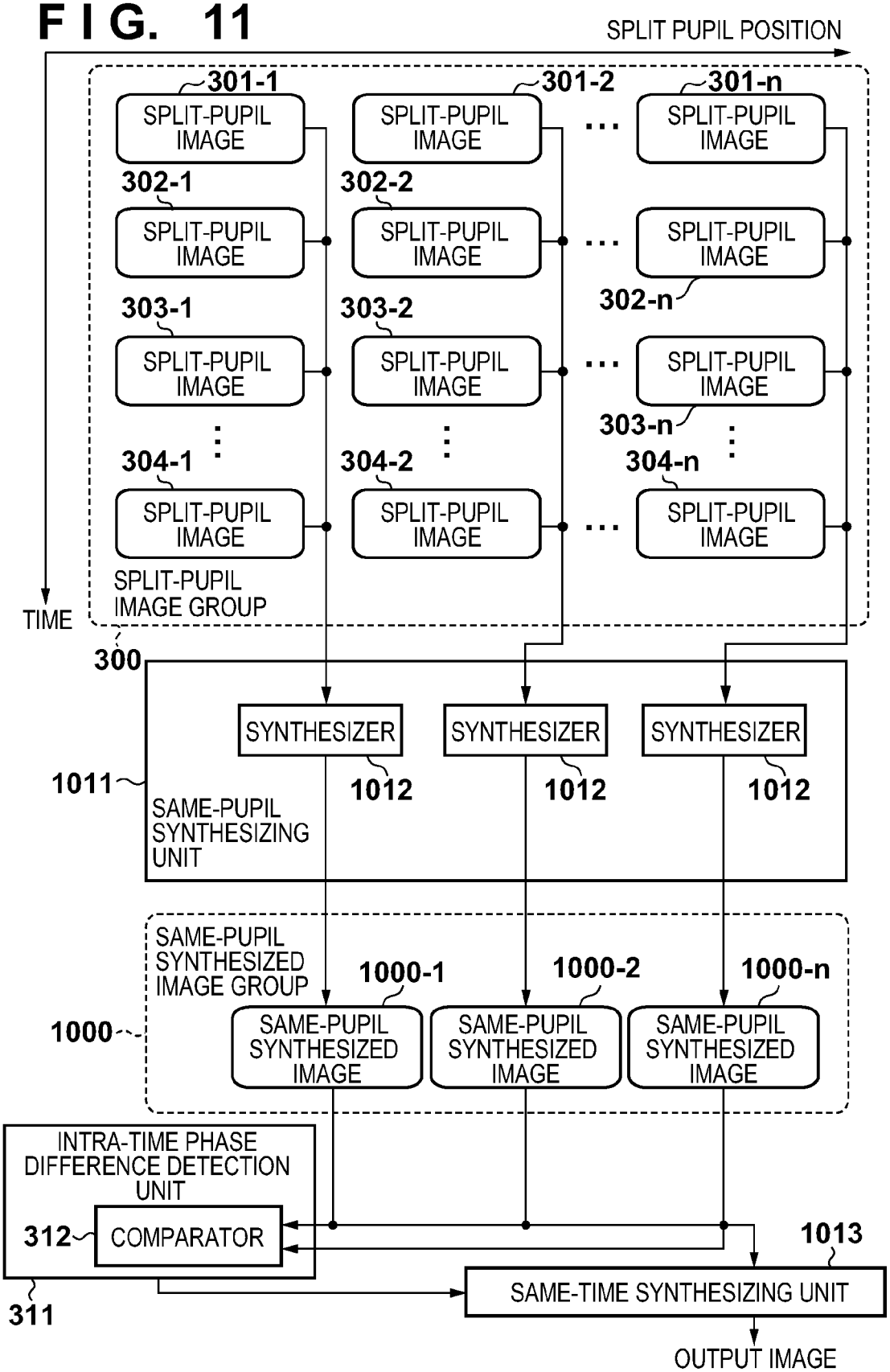
FIG. 11 is a diagram illustrating the hardware configuration, related to a process for generating a reconstructed image, in an image processing unit 103, according to a sixth embodiment of the present invention.

Specifically, as shown in FIG. 11, each of the split-pupil images generated from the LF data shot at different times in each split-pupil region is inputted into a corresponding synthesizer 1012 of the same-pupil synthesizing unit 1011. Each synthesizer 1012 in the same-pupil synthesizing unit 1011 synthesizes the split-pupil images obtained at different times for each of the split-pupil region without positioning those images, and generates the same number of same-pupil synthesized images as there are pupil divisions. The comparator 312 of the intra-time phase difference detection unit 311 then detects the phase difference between the same-pupil synthesized images, and the same-time synthesizing unit 1013 positions and synthesizes the same-pupil synthesized images in accordance with information of the phase difference in order to generate the reconstructed image.

In this manner, with the image processing unit 103 according to the present embodiment, the synthesizing process is performed without carrying out positioning when synthesizing split-pupil images obtained at different times. This is because the digital camera 100 is fixed during the shooting, and it is therefore assumed that no blur will be produced in the subject image due to camera shake as time passes. In other words, in a situation such as where the digital camera 100 is fixed, it is possible to eliminate the need to detect phase differences in the time direction, which in turn makes it possible to reduce the overall amount of processing related to the process for generating the reconstructed image.

Note that switching to a process such as that described in the present embodiment may be carried out by, for example, the camera control unit 101 detecting that the digital camera 100 has been affixed to a tripod and performing control so as to cause the image processing unit 103 to change its processing.

Seventh Embodiment

Figure 12A:
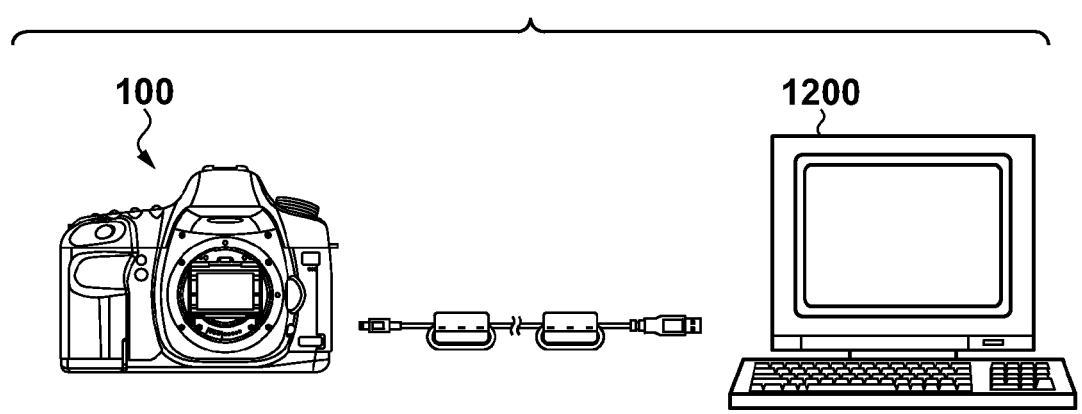
FIGS. 12A and 12B are diagrams illustrating a system configuration and the configuration of a GUI of an application used in a process for generating a reconstructed image, according to a seventh embodiment of the present invention.

The aforementioned first to fifth embodiments describe the process for generating the reconstructed image as being performed by the image processing unit 103 of the digital camera 100. However, the present invention is not limited thereto, and as shown in FIG. 12A, the processing may be performed by a PC 1200 connected to the digital camera 100, or by a PC 1200 that has recorded the LF data or the split-pupil images in a recording medium.

Note that in the case where the PC 1200 is to process the LF data, any procedure may be used as long as information enabling a series of time when the LF data was shot to be understood, as well as information of the pixels associated with each microlens, can be obtained as metadata. Meanwhile, in the case where information of the focal position is used in the process for generating the reconstructed image, the information of the focal position is included in the metadata.

Meanwhile, in the case where the split-pupil images are to be processed by the PC 1200, any procedure may be used as long as information of a disparity amount between images (determined by the optical imaging system 202, the microlens array 108, and so on), indicating a positional relationship in space among the split-pupil images, can be obtained as metadata.

Figure 12B:
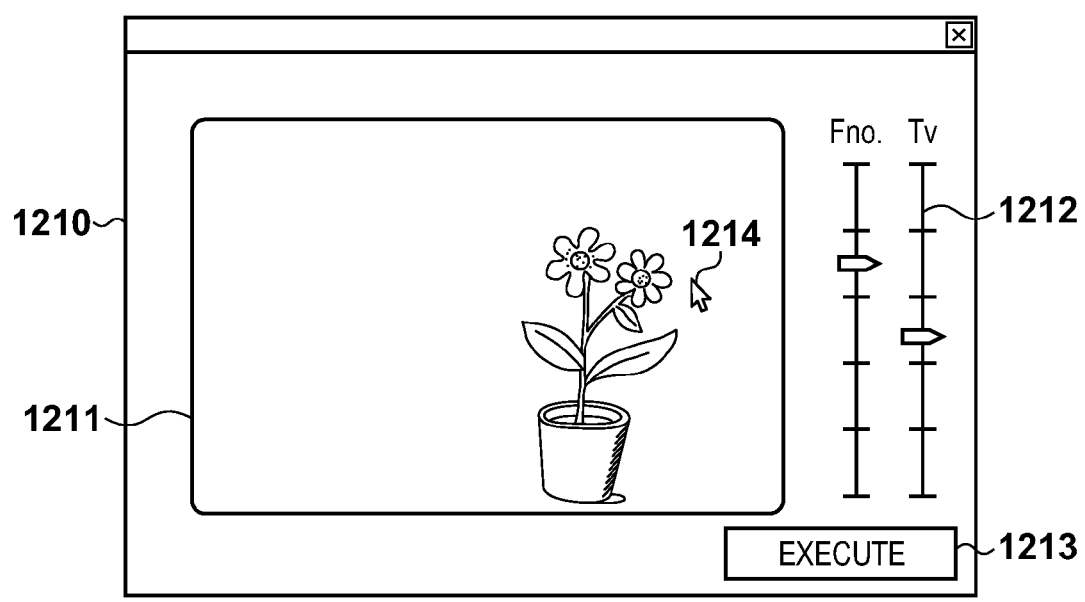

FIG. 12B illustrates an example of an operating window 1210, serving as a GUI of an application that generates the reconstructed image, that is presented to the user by the PC 1200 according to the present embodiment. The operating window 1210 includes a display section 1211 that displays the reconstructed image, a parameter adjustment section 1212 for changing conditions under which the reconstructed image is generated, and an execute button 1213 for instructing the reconstructed image to be output under the adjusted conditions. The user can manipulate the various elements of the GUI by moving a pointer 1214 using a pointing device such as a mouse or the like.

When a group of LF data or split-pupil images shot at different times, to be used to generate the reconstructed image, is selected by the user, the reconstructed image generated under predetermined conditions is displayed in the display section 1211. By moving the pointer 1214 and specifying a desired point within the display section 1211, the user can display, in the display section 1211, a reconstructed image that focuses on the subject at that position.

In addition, by adjusting the various parameters in the parameter adjustment section 1212 to desired values, the user can display, in the display section 1211, a reconstructed image based on those parameters. In the present embodiment, an F number (Fno.) and an exposure time (Tv) are included as the adjustable parameters in the parameter adjustment section 1212. By changing the F number parameter, the user can set the split-pupil regions used in the generation of the reconstructed image, whereas by changing the exposure time parameter, the user can set the number of syntheses in the time direction. Note that the method for setting the details of the processing for generating the reconstructed image is not limited thereto, and the operating window 1210 may also include a button-based UI for specific functions such as image stabilization or the like.

Variations

Figure 13A:
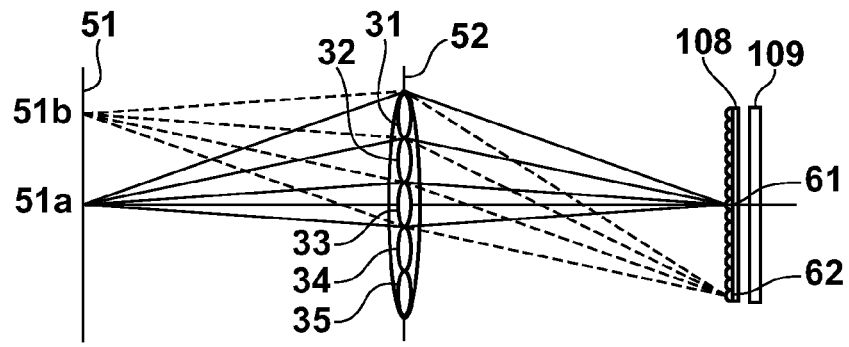
FIGS. 13A, 13B, 13C, and 13D are diagrams illustrating other optical systems in which the present invention can be applied.
Figure 13B:
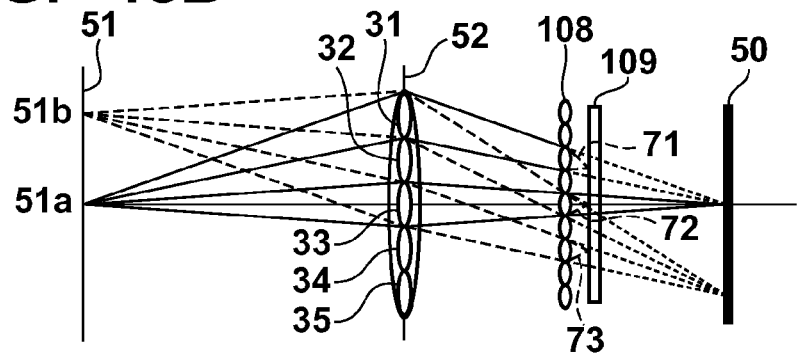
Figure 13C:
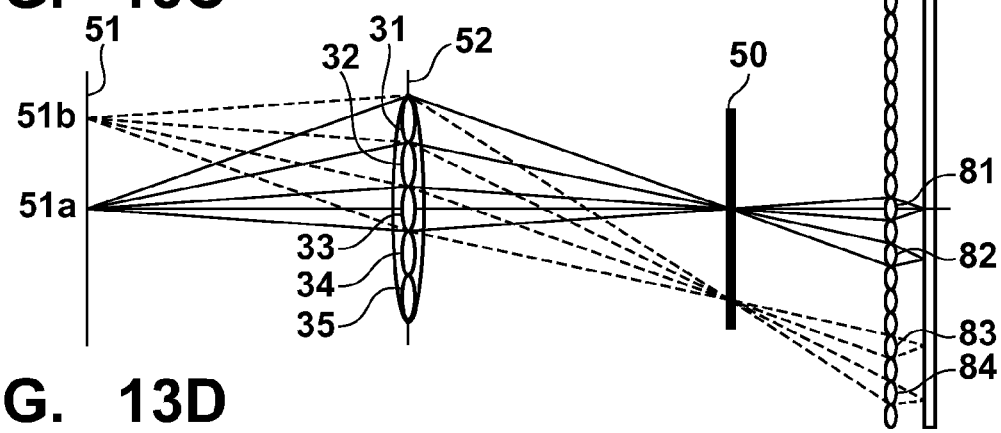

The present invention is not limited to the configuration of the optical system described using FIGS. 1 and 2A to 2C, and can also be applied in other optical systems, such as those shown in FIGS. 13A to 13C. FIGS. 13A to 13C are diagrams schematically illustrating light beams from an object (a subject) being formed upon the image sensor 109. FIG. 13A is an example corresponding to the optical system illustrated in FIGS. 2A to 2C, where the microlens array 108 is disposed in the vicinity of an image-forming surface of the optical imaging system 202. FIG. 13B illustrates an example in which the microlens array 108 is disposed closer to the object than the image-forming surface of the optical imaging system 202. FIG. 13C illustrates an example in which the microlens array 108 is disposed further from the object than the image-forming surface of the optical imaging system 202.

In FIGS. 13A to 13C, elements that are the same as those in FIGS. 2A to 2C are given the same reference numerals, and redundant descriptions thereof have been omitted. 51 indicates an object plane, and 51a and 51b indicate given points upon the object plane. 52 indicates a pupil plane of the optical imaging system 202, whereas 61, 62, 71, 72, 73, 81, 82, 83, and 84 each indicate specific microlenses in the microlens array 108.

In FIGS. 13B and 13C, a virtual image sensor 109a and a virtual microlens array 108a are shown in order to clarify the correspondence relationship with FIG. 13A. Furthermore, light beams passing from the point 51a on the object plane through the split-pupil regions 31 and 33 of the pupil plane 52 are indicated by solid lines, whereas light beams passing from the point 51b on the object plane through the split-pupil regions 31 and 33 of the pupil plane 52 are indicated by broken lines.

In the example shown in FIG. 13A, by disposing the microlens array 108 in the vicinity of the image-forming surface of the optical imaging system 202, the image sensor 109 and the pupil plane 52 of the optical imaging system are in a conjugate relationship, in the same manner as illustrated in FIG. 3. Furthermore, the object plane 51 and the microlens array 108 are in a conjugate relationship. Accordingly, the light beam from the point 51a on the object plane 51 reaches the microlens 61, the light beam from the point 51b reaches the microlens 62, and the light beams that have passed through the split-pupil regions 31 through 35 each reach pixels provided so as to correspond to the microlenses.

In the example shown in FIG. 13B, the microlens array 108 forms images from the light beams from the optical imaging system 202, and the image sensor 109 is provided on that image-forming surface. By disposing the microlens array 108 in this manner, the object plane 51 and the image sensor 109 are in a conjugate relationship. The light beam from the point 51a on the object plane 51 passes through the split-pupil region 31 of the pupil plane 52 and reaches the microlens 71, whereas the light beam from the point 51a that passes through the split-pupil region 33 of the pupil plane reaches the microlens 72. Likewise, the light beam from the point 51b on the object plane 51 passes through the split-pupil region 31 of the pupil plane 52 and reaches the microlens 72, whereas the light beam from the point 51b that passes through the split-pupil region 33 of the pupil plane 52 reaches the microlens 73. The light beams that pass through each microlens reach the pixels provided corresponding to the microlens. In this manner, the light beams from the object plane form images in different positions on the image-capturing surface of the image sensor 109 based on the exit positions of those light beams and the split-pupil regions through which the light beams pass. If the positions of these images are rearranged on a virtual image-capturing surface 50, the same information as the information obtained by the image-capturing surface in FIG. 13A can be obtained. In other words, information of the split-pupil regions through which the light beams have passed (angles of incidence) and positions on the image sensor 109 can be obtained.

In the example shown in FIG. 13C, the light beams from the optical imaging system 202 are once again caused to form an image on the microlens array 108 ("again" because light beams that have formed an image are diffused and then caused to form an image again), and the image-capturing surface of the image sensor 109 is disposed at that re-forming surface. By disposing the microlens array 108 in this manner, the object plane 51 and the image sensor 109 are in a conjugate relationship. The light beam from the point 51a on the object plane 51 passes through the split-pupil region 31 of the pupil plane 52 and reaches the microlens 82, whereas the light beam from the point 51a that passes through the split-pupil region 33 of the pupil plane 52 reaches the microlens 81. Likewise, the light beam from the point 51b on the object plane 51 passes through the split-pupil region 31 of the pupil plane 52 and reaches the microlens 84, whereas the light beam from the point 51b that passes through the split-pupil region 33 of the pupil plane 52 reaches the microlens 83. The light beams that pass through each microlens reach the pixels provided corresponding to the microlens.

In the same manner as the case illustrated in FIG. 13B, if the signals from the pixels obtained by the image sensor 109 have their positions on the virtual image-capturing surface 50 rearranged, the same information as the information obtained by the image-capturing surface illustrated in FIG. 13A can be obtained. In other words, information of the split-pupil regions through which the light beams have passed (angles of incidence) and positions on the image sensor 109 can be obtained.

Figure 13D:
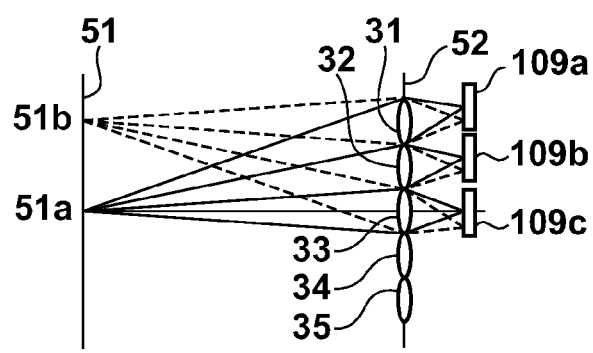

Although FIGS. 13A to 13C illustrate examples of configurations where pupil division is carried out using the microlens array 108 (serving as a phase modulation element) and position information and angle information of the light beams are obtained, other configurations can be used as long as they are capable of obtaining position information and angle information (equivalent to restricting the regions of the pupil through which the light beams pass). For example, the configuration may use a pattern mask (a gain modulation element) configured by repeating a basic pattern instead of the microlens array 108. The present invention is also applicable in a multieye optical system (camera array), as shown in FIG. 13D. In FIG. 13D, the respective cameras in the multieye optical system have optical imaging systems disposed in locations to correspond to the split-pupil regions 31 to 35 in FIGS. 13A to 13C, and form images on respective image sensors 109a to 109c. The images obtained by the respective image sensors in this manner have different shooting positions, and correspond to the aforementioned RAW images from each split-pupil region. Accordingly, insufficient color component signal intensities can be interpolated in a favorable manner for each pixel by specifying pixels in which the same subject image is formed in accordance with the positional relationships between the cameras.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-024915, filed Feb. 12, 2013, which is hereby incorporated by reference herein in its entirety.

What is claimed is:
1. An image processing apparatus comprising:
an obtainment unit that obtains a plurality of images obtained by shooting a subject at different positions, at each of a plurality of timings;
a first detection unit that detects a phase difference between the images obtained at the same timing;
a second detection unit that detects a phase difference between the images obtained at the same position but at different timings; and
a generating unit that generates an output image by synthesizing at least some of the images obtained by the obtainment unit so that at least one of the phase differences between the some of the images, which are detected by the first detection unit and the second detection unit, is reduced, wherein in the case of a setting for generating an image corresponding to a long-exposure shooting, the generating unit adjusts an exposure amount and a depth of field of the output image by controlling shot positions and obtained timings of images used for the synthesis.

2. The image processing apparatus according to claim 1, wherein in the case of a setting for holding a state of focus on a specific subject, the generating unit performs the synthesis so as to reduce the phase difference detected by the first detection unit.

3. The image processing apparatus according to claim 1, wherein in the case of a setting for eliminating the influence of camera shake during shooting, the generating unit performs the synthesis so as to reduce the phase difference detected by the second detection unit.

4. The image processing apparatus according to claim 1, wherein in the case of a setting for generating an image in which the subject being focused on is to be enhanced, the generating unit generates the output image by synthesizing images, of the images obtained by the obtainment unit, that have been obtained at a plurality of positions in a relationship where relative disparity amounts between the images are high, without reducing a phase difference at least between images obtained at the same time.

5. The image processing apparatus according to claim 1, further comprising:
a detection unit that detects a specific subject image in the images obtained by the obtainment unit,
wherein the generating unit performs the synthesis so as to reduce a phase difference in the specific subject image detected by the detection unit.

6. The image processing apparatus according to claim 1, wherein in the case where the images obtained by the obtainment unit are images shot in a state where an image capturing apparatus that shot the images is fixed, the generating unit generates the output image by synthesizing at least some of the images obtained by the obtainment unit without positioning the images so as to reduce a phase difference among images shot and obtained at different timings, and then synthesizes the images obtained by the initial synthesis so as to reduce the phase difference detected by the first detection unit.

7. The image processing apparatus according to claim 1, wherein the plurality of images obtained by shooting the same subject at different positions are obtained from image signals corresponding to light beams having different combinations of split-pupil regions and incident directions passing through an optical imaging system of the image capturing apparatus, by linking the respective pixels corresponding to light beams that have passed through the same split-pupil region.

8. An image capturing apparatus comprising:
a shooting unit that shoots a subject at different positions at each of a plurality of timings and outputs a plurality of images obtained through the shooting;
a first detection unit that detects a phase difference between the images obtained at the same timing output by the shooting unit;
a second detection unit that detects a phase difference between the images obtained at the same position but at different timings output by the shooting unit; and
a generating unit that generates an output image by synthesizing at least some of the images obtained by the obtainment unit so that at least one of the phase differences between the some of the images, which are detected by the first detection unit and the second detection unit, is reduced,
wherein in the case of a setting for generating an image corresponding to a long-exposure shooting, the generating unit adjusts an exposure amount and a depth of field of the output image by controlling shot positions and obtained timings of images used for the synthesis.

9. A control method for an image processing apparatus, the method comprising:
an obtainment step of obtaining of plurality of images obtained by shooting a subject at different positions, at each of a plurality of timings;
a first detection step of detecting a phase difference between the images obtained at the same timing;
a second detection step of detecting a phase difference between the images obtained at the same position but at different timings; and
a generating step of generating an output image by synthesizing at least some of the images obtained in the obtainment step so that at least one of the phase differences between the some of the images, which are detected in the first detection step and the second detection step, is reduced,
wherein in the case of a setting for generating an image corresponding to a long-exposure shooting, an exposure amount and a depth of field of the output image are adjusted by controlling shot positions and obtained timings of images used for the synthesis.

10. A non-transitory computer-readable recording medium on which is recorded a program for causing a computer to execute the following steps:
an obtainment step of obtaining a plurality of images obtained by shooting a subject at different positions, at each of a plurality of timings;
a first detection step of detecting a phase difference between the images obtained at the same timing;
a second detection step of detecting a phase difference between the images obtained at the same position but at different timings; and
a generating step of generating an output image by synthesizing at least some of the images obtained in the obtainment step so that at least one of the phase differences between the some of the images, which are detected in the first detection step and the second detection step, is reduced, and
wherein in the case of a setting for generating an image corresponding to a long-exposure shooting, an exposure amount and a depth field of the output image are adjusted by controlling shot positions and obtained timings of images used for the synthesis.

* * * * *